(12) United States Patent
Stifelman et al.

(10) Patent No.: US 6,217,755 B1
(45) Date of Patent: Apr. 17, 2001

(54) IN-TANK FLUID FILTER WITH VALVE ASSEMBLY

(75) Inventors: Jack Stifelman, Bolivar, MO (US); Johan Fobe, Wilsele (BE); Angelo Schiavon, Ostiglia; Enrico Greco, Villa Poma, both of (IT)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/012,068

(22) Filed: Jan. 22, 1998

(51) Int. Cl.[7] .................. B01D 35/027; B01D 35/147
(52) U.S. Cl. .................. 210/116; 210/130; 210/136; 210/137; 210/299; 210/428; 210/430; 210/436; 210/438; 210/450; 210/454
(58) Field of Search .................. 210/109, 116, 210/117, 130, 133, 137, 168, 171, 172, 196, 299, 428, 430, 436, 450, 454, 767, 136, 249, 438; 137/540

(56) References Cited

U.S. PATENT DOCUMENTS

| | | | |
|---|---|---|---|
| 3,189,046 | * | 6/1965 | Callahan et al. ............ 137/540 |
| 3,819,052 | | 6/1974 | Firth . |
| 3,827,558 | | 8/1974 | Firth . |
| 3,847,819 | | 11/1974 | Firth . |
| 4,133,763 | | 1/1979 | Cooper .................. 210/232 |
| 4,369,113 | | 1/1983 | Stifelman . |
| 4,428,834 | | 1/1984 | McBroom et al. . |
| 4,446,019 | | 5/1984 | Robinson . |
| 4,480,160 | | 10/1984 | Stifelman . |
| 4,512,882 | | 4/1985 | Fischer et al. . |
| 4,522,712 | | 6/1985 | Fischer et al. . |
| 4,611,627 | | 9/1986 | Eidsvoog et al. . |
| 4,615,800 | | 10/1986 | Stifelman et al. . |
| 4,657,040 | | 4/1987 | Torres .................. 137/110 |
| 4,743,374 | | 5/1988 | Stifelman . |
| 4,834,885 | | 5/1989 | Misgen et al. . |
| 4,883,083 | | 11/1989 | Fisher et al. . |
| 4,906,365 | * | 3/1990 | Baumann et al. ............ 210/454 |
| 5,104,537 | | 4/1992 | Stifelman et al. . |
| 5,342,519 | | 8/1994 | Friedmann et al. . |
| 5,395,518 | | 3/1995 | Gulsvig . |
| 5,501,791 | | 3/1996 | Theisen et al. . |
| 5,660,726 | * | 8/1997 | Dluzik .................. 210/130 |

FOREIGN PATENT DOCUMENTS

| | | | |
|---|---|---|---|
| 42 06 420 A1 | 9/1993 | (DE) | ............ B01D/27/10 |
| 0 089 446 A | 9/1983 | (EP) | ............ B01D/35/14 |
| 0 819 458 A1 | 1/1998 | (EP) | ............ B01D/35/147 |
| 2226254 | * 6/1990 | (GB) | ............ 210/450 |
| 637971 | * 4/1962 | (IT) | ............ 210/130 |

* cited by examiner

Primary Examiner—Matthew O. Savage
(74) Attorney, Agent, or Firm—Merchant & Gould P.C.

(57) ABSTRACT

The filter head and filter housing define a liquid flow inlet path, a first liquid flow outlet path, and a second liquid flow outlet path. A filter media construction is positioned within the housing. The filter media construction, in combination with the housing, defines an unfiltered liquid volume, and a filtered liquid volume. A first liquid flow inlet path directs liquid from the liquid flow inlet to the unfiltered liquid volume. A first liquid flow outlet path directs liquid flow from the filtered liquid volume to the first liquid flow outlet. A second liquid flow outlet path directs liquid flow from the filtered liquid volume to the second liquid flow outlet. A first valve assembly selectively opens the second liquid flow path to passage of liquid therethrough in response to a first selected liquid pressure level within the filtered liquid volume. A second valve assembly comprises a first bypass valve assembly, and selectively directs fluid flow from the unfiltered liquid volume to the second liquid flow outlet, in response to a second selected liquid pressure level within the unfiltered liquid volume.

18 Claims, 10 Drawing Sheets

IN-TANK FLUID FILTER WITH VALVE ASSEMBLY

FIELD OF THE INVENTION

This invention relates generally to fluid filters and methods. More particularly, this invention relates to liquid filters. One application described is a hydraulic in-tank filter.

BACKGROUND OF THE INVENTION

Fluid filters have been employed in a variety of applications including hydraulic systems, fuel systems, and engine lubrication systems.

Liquid filters which have sensitive downstream components are of a concern. Particularly, it is of concern to prevent cavitation of pumps downstream from liquid filters. Conditions such as cold starts, flow surges, or occluded elements can result in damaged downstream components. Improvements are desirable.

SUMMARY OF THE INVENTION

The invention is directed to a liquid filter assembly. To achieve the advantages of the invention and in accordance with the purposes of the invention, as embodied and broadly described herein, a liquid filter assembly comprises a filter head and filter housing. The filter head and filter housing define a liquid flow inlet path, a first liquid flow outlet path, and a second liquid flow outlet path. A filter media construction is positioned within the housing. The filter media construction, in combination with the housing, defines an unfiltered liquid volume, and a filtered liquid volume. A liquid flow inlet is provided in the assembly. The first liquid flow inlet path is constructed and arranged to direct liquid from the liquid flow inlet to the unfiltered liquid volume. A first liquid flow outlet is provided in the assembly. The first liquid flow outlet path is constructed and arranged to direct liquid flow from the filtered liquid volume to the first liquid flow outlet. A second liquid flow outlet is provided. The second liquid flow outlet path is constructed and arranged to direct liquid flow from the filtered liquid volume to the second liquid flow outlet. A first valve assembly, or backflow pressure valve, is constructed and arranged to selectively open the second liquid flow path to passage of liquid therethrough in response to a first selected liquid pressure level within (or differential including) the filtered liquid volume. A second valve assembly comprises a first bypass valve assembly, and is constructed and arranged to selectively direct fluid flow from the unfiltered liquid volume to the second liquid flow outlet, in response to a second selected liquid pressure level within (or differential including) the unfiltered liquid volume.

In one arrangement, the liquid flow inlet and the first liquid flow outlet are positioned within the filter head.

Preferably, the housing comprises an elongate, generally cylindrical wall having first and second opposite ends. The housing first end is secured to the filter head, and the housing second end is positioned remote to the filter head and includes the second liquid flow outlet therein.

In one embodiment, the filter media construction comprises a cylindrical extension of media defining an internal volume. The filter media internal volume comprises at least a portion of the filtered liquid volume. Preferably, the filter media construction includes first and second end caps with the cylindrical extension of media extending therebetween. The first end cap has an open central aperture in fluid flow communication with the media internal volume and the first outlet flow path. The second end cap has an open central aperture with the first valve assembly positioned therein.

In one arrangement, the first valve assembly comprises a tubular outer wall including, positioned therein, a first spring-loaded valve head and a first valve seat having a flow port extending therethrough. Details are later described.

In certain arrangements, the second valve assembly includes a second spring-loaded valve head and a second valve seat having a flow port extending therethrough. Details are later described.

In certain arrangements, the spring of the second valve assembly and the spring of the first valve assembly comprise opposite end portions of the same spring.

Preferably, the filter head includes an air flow channel therethrough, and the assembly includes a breather filter construction mounted on the filter head and oriented in air flow communication with the air flow channel in the filter head.

The arrangement is particularly well constructed to operate as an "in-tank" filter. That is, it is used to filter fluid circulating to a reservoir tank, such as a hydraulic fluid reservoir.

In certain preferred arrangements, the filter media construction is secured to a removable centerpiece or center piece of the filter head. In such arrangements, the removable centerpiece is positioned in a bore in a base member of the filter head of sufficient size so that when the centerpiece is withdrawn from the base member, the filter media construction is withdrawn upwardly through the bore in the base member for servicing. Preferably, the filter media construction is removably secured to the centerpiece so that during servicing, a first filter media construction attached to the centerpiece can be replaced by a second filter media construction.

The filter media construction may include a contaminant collection trap mounted thereon.

The invention also provides a method for changing a filter element in a housing. The method comprises a step of detaching a service cover from a filter head. After the step of detaching the service cover, the filter element is removed from the housing by removing the service cover from the filter head and pulling the filter element through an aperture defined by a bore in the filter head.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

I. Example Application and Operation

Figure 1:
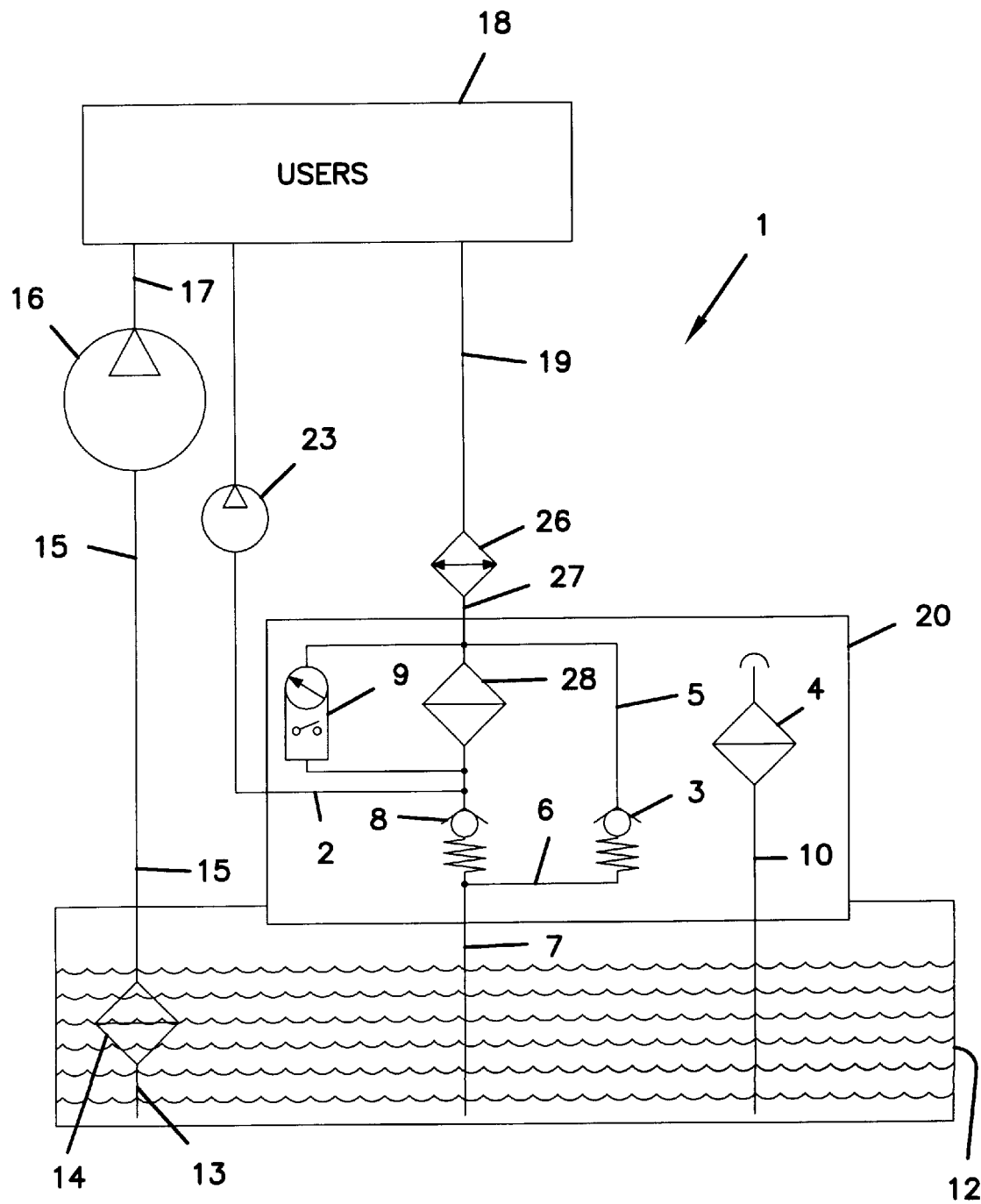
FIG. 1 is a schematic diagram depicting a closed loop hydraulic system and a fluid filter arrangement, according to the present invention.

FIG. 1 illustrates a schematic indicating a typical system in which a filter of the present invention would be utilized. Referring to FIG. 1, a closed loop hydraulic circuit is illustrated generally at 1. One example of use for such a system is in a large excavator, or other earth moving equipment. A tank 12 is for holding and storing fluid, for example liquid, and more particularly, hydraulic liquids.

An in-tank filter assembly 20 is mounted on the tank 12 and may be partially submerged within the fluid in the tank 12. Users of the hydraulic fluid are shown generally at 18. A main pump 16 and a sensitive pump 23 convey fluid from the tank 12 to the users 18. For example, the main pump 16 may convey fluid to energize the main power users, such as lifting equipment of a trencher. The sensitive pump 23 may convey fluid to energize components in which tight motion control is desirable, such as in power-assists. The in-tank filter assembly 20 provides for cleaning of the fluid prior to being conveyed to the users 18.

A first intake line is shown at 13 being fed to a strainer 14 to initially filter large particles and contaminants from the fluid. The main pump 16 draws the fluid from the strainer into line 15. From there, the fluid exits the main pump 16 through line 17 and is fed to the users 18.

After the users 18 have used the fluid, the fluid is conveyed out through a line 19 and to the in-tank filter assembly 20. Prior to being conveyed to the filter assembly 20 it may pass through a heat exchanger 26. The fluid is conveyed into the filter assembly 20 at an inlet line 27. From there, it is directed through a main filter element 28. The filter element 28 cleans the fluid by removing particles and contaminants from the fluid. If the main filter element 28 becomes occluded, a bypass valve 3 is provided. That is, if the element 28 becomes clogged such that a pressure differential across the filter media 28 creates a force that overcomes a force exerted by the bypass valve 3, the fluid passes through line 5 through the bypass valve 3 into line 6, where it is then dumped into the tank 12 at line 7.

Both the main pump 16 and the sensitive pump 23 are drawing on the liquid in the system. A back pressure flow valve 8 is provided to allow for the flow of filtered fluid from the filter element 28 to be conveyed into the tank 12 and to create a positive pressure of filtered fluid for use to charge the sensitive pump 23. Specifically, the back pressure flow valve 8 selectively opens a liquid flow path to passage of liquid from the main filter element 28 into the line 7 and into the tank 12 in response to a selected pressure liquid pressure level within (or differential including) the filtered liquid volume in the main filter element 28. The resistance force of the back pressure flow valve 8 against the fluid flow therethrough introduces a positive pressure to push a portion or fraction of fluid into line 2 and to sensitive pump 23.

An indicator 9 senses pressure differentials across the main filter element 28.

The filter assembly 20 includes a breather filter 4. The breather filter 4 is in fluid (i.e., air flow) communication with a line 10. The line 10 allows for the intake and exhaustion of air from the tank 12. The breather filter 4 filters the intake of air flowing into the tank 12, and permits the exhaustion of air therethrough from the tank 12.

Figure 2:
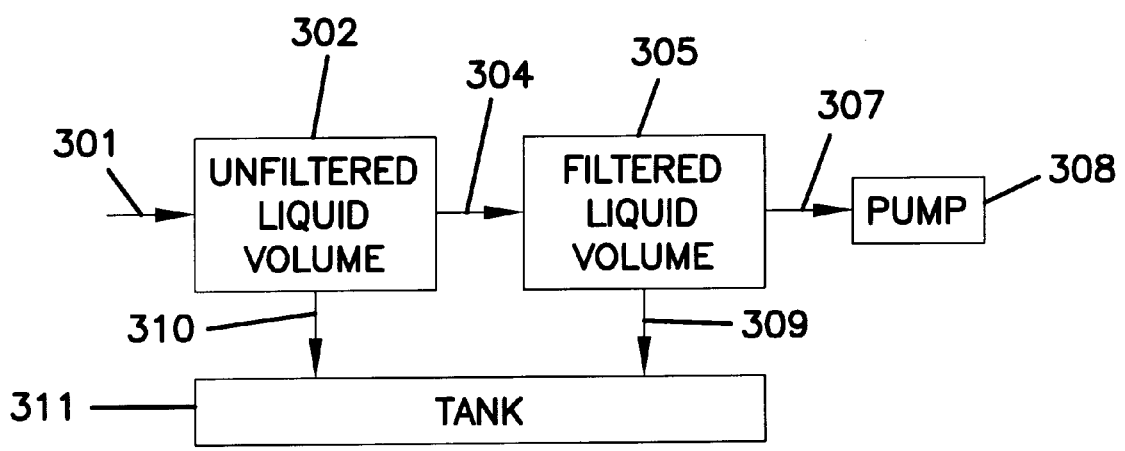
FIG. 2 is a schematic diagram illustrating one example operation of a fluid filter arrangement, according to the present invention.

FIG. 2 is a schematic diagram illustrating one example operation of the in-tank filter assembly 20 shown in FIG. 1. Unfiltered fluid first flows through an inlet along path 301. After it flows through the inlet, it becomes part of the unfiltered liquid volume 302. From there, the liquid may take at least one of two different flow paths, depending upon a state of a bypass valve. If the bypass valve is closed, the liquid flows along path 304 through filter media, where it becomes part of a filtered liquid volume 305. From there, the liquid in the filtered liquid volume 305 may take at least one of two flow paths. The majority of the liquid will flow through the back pressure flow valve and through the second outlet along path 309. From there, it is typically conveyed into the tank 311. The back pressure flow valve creates a positive pressure, propelling a small fraction of the liquid from the filtered liquid volume 305 to flow into a first outlet along path 307. From there, the liquid may pass into a pump 308, for example sensitive pump 23 (FIG. 1), and ultimately to users.

If the bypass valve is in an open state, for example, if the filter media is wholly or partially occluded, the liquid can flow through the bypass valve, through a second outlet along path 310, and then into, for example, a tank 311.

II. Overall Assembly

Figure 3:
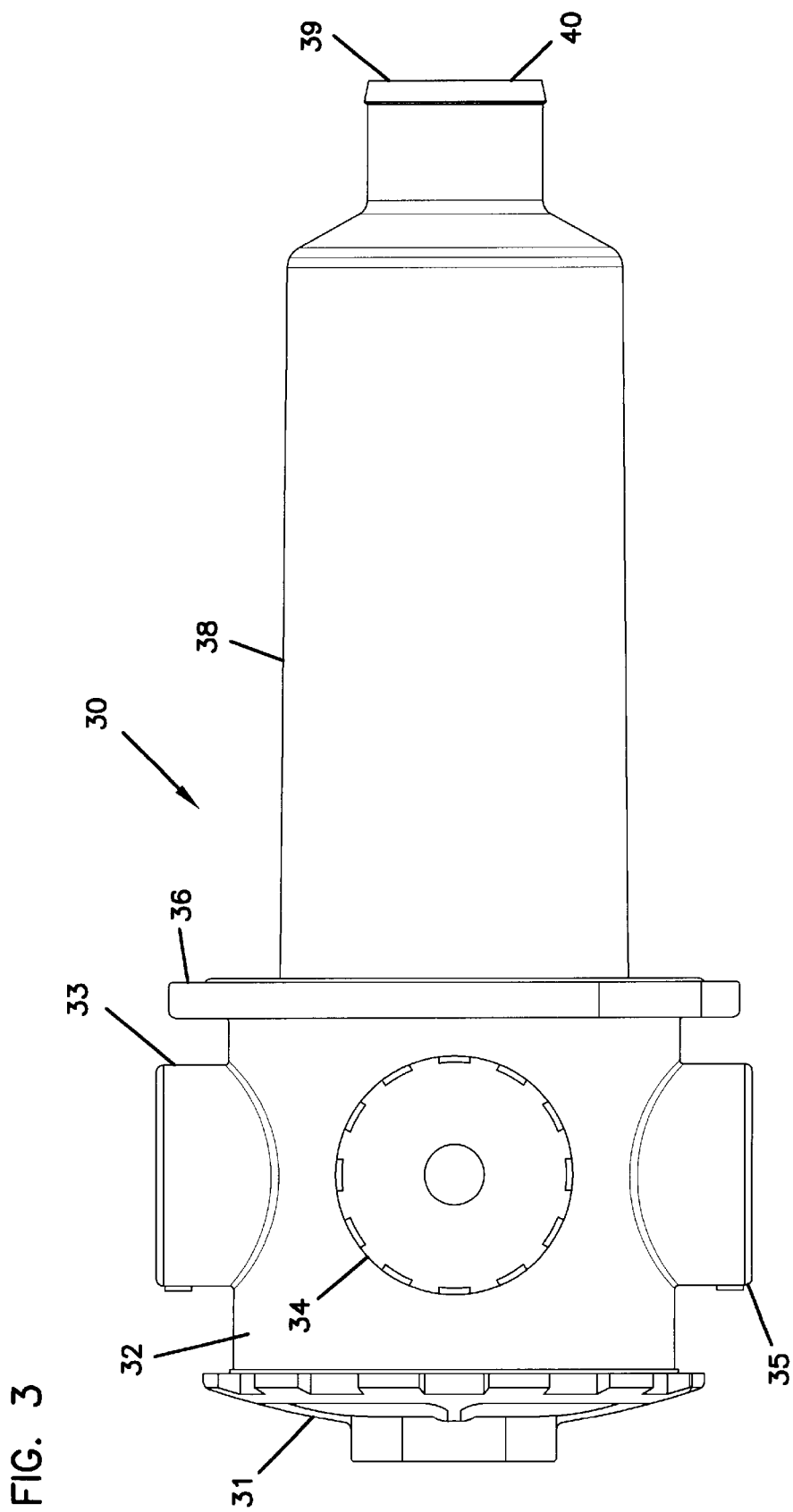
FIG. 3 is a side elevational view of a filter head and housing, according to the present invention.
Figure 4:
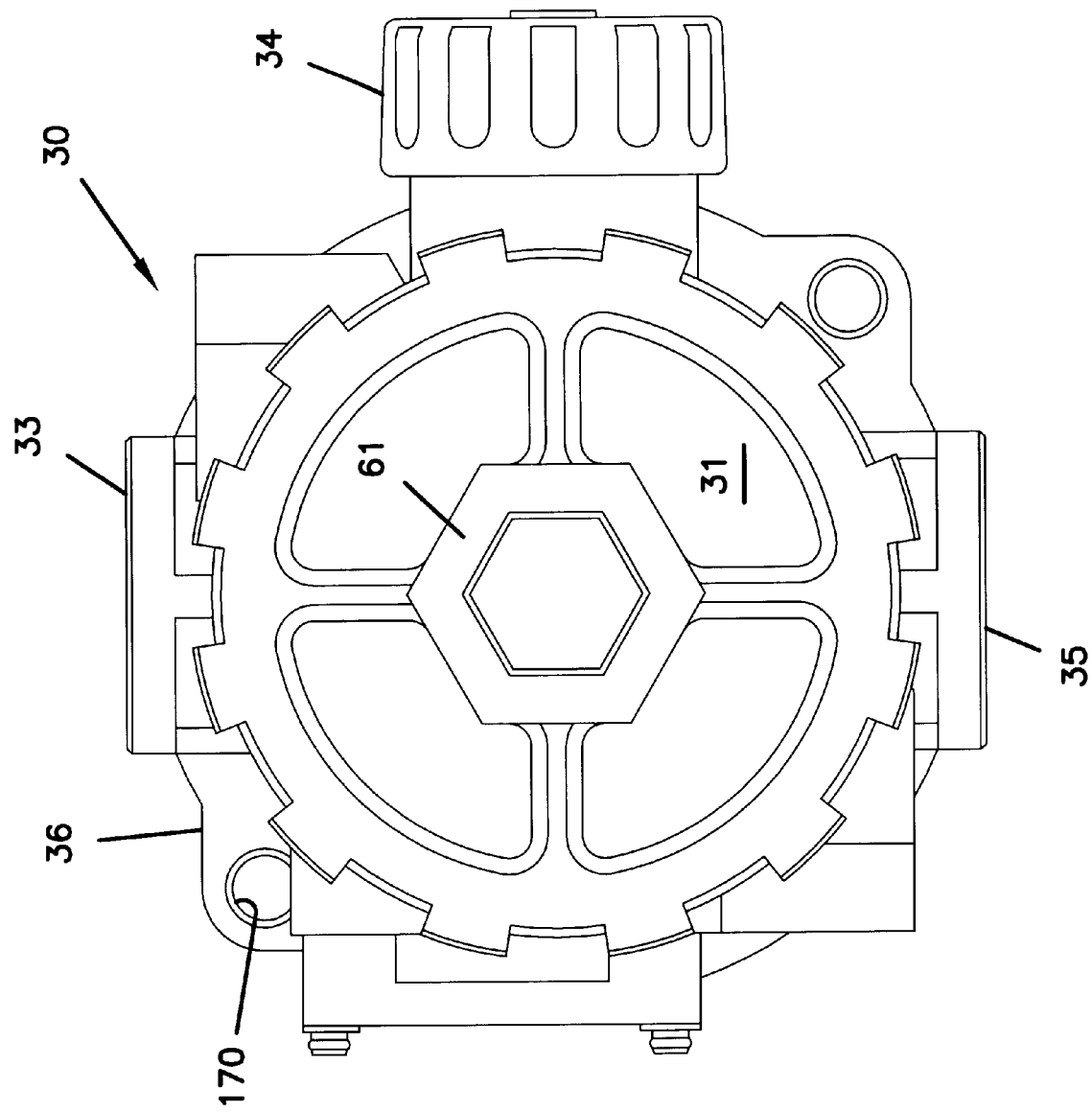
FIG. 4 is a top plan view of the filter head and housing depicted in FIG. 3.

Turning now to FIGS. 3 and 4, a side elevational view and a top plan view of a filter head and housing of an in-tank filter of the type illustrated at 20 in FIG. 1 is depicted. In FIG. 3, a combination filter head and housing is illustrated generally at 30. At one end of the assembly 30 is a service cover 31 removably attached to a filter head 32. The filter head defines an inlet 33 for receiving fluid flow from upstream components. The filter head 32 supports a breather filter 34 mountably supported thereon. A first outlet 35 is shown in the filter head as extending from an opposite side of the filter head 32 from the inlet 33. The first outlet 35 is usable, for example, to convey fluid to a downstream component, such as the sensitive pump 23 illustrated in FIG. 1. The filter head 32 also includes a flange 36 protruding from the side of the filter head 32. The flange 36 provides a mounting engagement surface for the assembly 30 on a tank, such as tank 12, FIG. 1. A housing 38 is attached to the filter head 32 and extends longitudinally therefrom. At a remote end 39, that is an end opposite to the end with service cover 31, is a second outlet 40. The second outlet 40 is for discharging fluid into, for example, the tank 12, FIG. 1.

The service cover 31 is removable from the housing 38. The service cover 31 allows for an internally received filter element to be removed from the interior of the housing 38 and to be replaced with a new filter element. As illustrated in FIG. 4, the service cover 31 includes a hexnut extension 61. The hexnut extension 61 provides for a gripping surface to allow for a tool to remove the service cover 31 from the housing 38.

Figure 6:
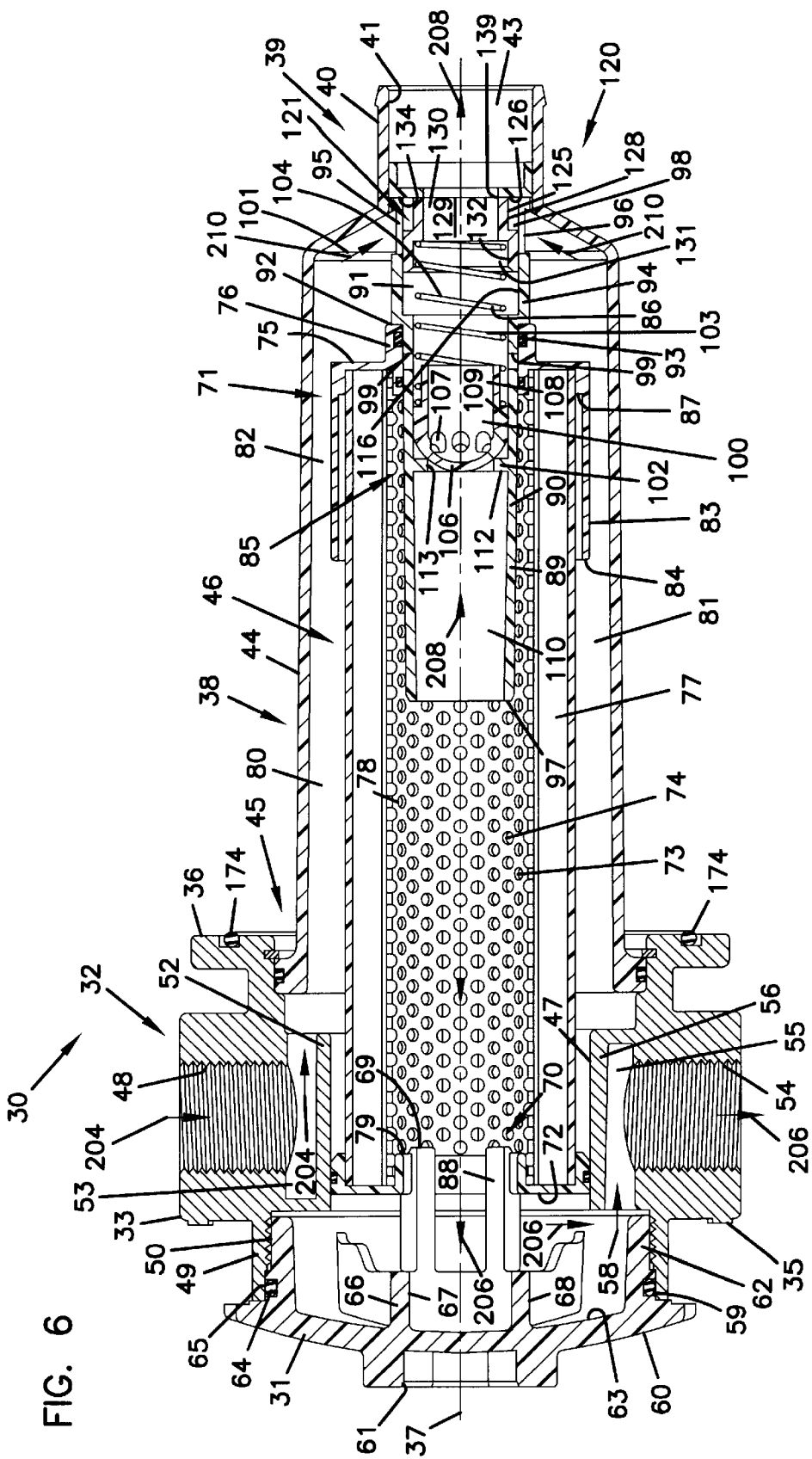
FIG. 6 is a cross-sectional view taken along the line 6—6 of FIG. 3.

Turning now to FIG. 6, the assembly shown in FIG. 2 is illustrated. The housing 38 includes a wall 44, constructed of a generally thin walled construction, and can be formed from plastic, such as a glass reinforced polyamide, or other suitable materials such as metal. The housing 38 includes a first end 45, closed by the filter head 32 and the remote end 39, which defines the second outlet 40.

The second outlet 40 is cylindrical in shape and defines an inner wall surface 41. The outlet 40 defines an interior region or volume 43. When assembled in a tank, such as tank 12 (FIG. 1), the region 43 is in fluid flow communication with the interior of the tank 12.

Referring to FIG. 6, the filter head 32 is in covering relation to the first end 45 of the housing. More specifically, the filter head 32 is attachably mounted to the housing 38, which attachments are described in more detail below. The inlet 33 defines a cylindrical bore 48 which defines a fluid flow conduit for conveying liquid into the assembly 30. The filter head 32 also includes a cylindrical wall 49 in extension generally normal to the inlet 33. The wall 49 defines an inner threaded surface 50. The threaded surface 50 is for receiving and mating with corresponding threads on the service cover 31.

In FIG. 6, the filter head 32 includes a cylindrical wall 52 spaced from the inlet 33 and first outlet 35, and circumscribing a filter element 46 therein. The cylindrical wall 52 defines a bore 47, through which the element 46 may be passed through when changing out the element. Spaced between the wall 52 and the cylindrical bore 48 of the inlet 33 is an inlet channel or conduit 53 through which incoming fluid passes. The wall 52, at the location adjacent to inlet 33, functions as a baffle and prevents the in-coming liquid from impinging directly against the filter element 46 while at high velocity.

The first outlet 35 defines an inner cylindrical bore 54 for providing a conduit for the passage of filtered liquid from the assembly 30, and to downstream components, for example the sensitive pump 23, FIG. 1. A wall 56 is attached to the first outlet 35 and is spaced from the cylindrical bore 54 to define a conduit 55. Conduit 55 allows filtered fluid to pass into the first outlet 35 and to downstream components. The conduit 55 is in open fluid communication with a space 58, so that fluid may exit the filter element 46 between projection 88 of the service cover 31, flow through the space 58, flow into the conduit 55 and flow out through the first outlet 35.

Preferably, the filter head 32 is die cast from aluminum.

Referring again to FIG. 6, the service cover 31 includes a generally curved exterior surface 60 culminating in the top central hexnut extension 61. The hexnut extension 61 allows for engagement with an appropriate tool in order to unscrew the service cover 31 from the filter head 32. The service cover 31 also includes a cylindrical wall 62 in extension from the exterior surface 60, and includes threads for engaging the threaded inner surface 50 of the wall 49 of the filter head 32. The wall 62 defines a circular groove 59.

A seal member is constructed and arranged to provide a seal between the filter head 32 and service cover 31. In the particular arrangement shown in FIG. 6, an O-ring 64 is positioned within groove 59 in wall 62 to provide a radial fluid seal 65 between the inner surface 50 and the service cover 31. The seal 65 prevents liquid from leaking through the service cover 31 and the filter head 32.

The service cover 31 defines an inner surface 63 oppositely disposed to the curved exterior surface 60, shown in FIG. 6. Projecting in extension from the inner surface 63 is a cylindrical wall 66. Cylindrical wall 66 defines a cylindrical bore 67. The cylindrical wall 66 transitions into gripper segments 88, and the spaces between the segments 88 are part of the outlet flow path conduit. The cylindrical wall 66 includes an outer surface 68 disposed opposite to the inner cylindrical wall 66. The shoulders or lips 69 of segments 88, when assembled in the arrangement shown in FIG. 3, provides for an engagement surface for the filter element 46.

The service cover 31 is constructed and arranged to be removably attachable to the filter element 46. This permits the filter element 46 to be removed from the interior of the housing 38 and be replaced with a new filter element. One example of structure for allowing removable attachment includes a snap engagement between the service cover 31 and the filter element 46. In the particular example illustrated in FIG. 6, the outer wall 68 includes the plurality of projections or segments 88 each having lip 69 projecting from the peripheral surface of the outer wall 68. The segments 88 are flexible and deflect to allow for mating engagement with the first end cap 72. Specifically, the segments 88 and lips 69 provide a catch for an end surface 79 of a first end cap 72 on the filter element 46. In this way, when the service cover 31 is removed from the filter head 32, the lips 69 are engaged with, and hold, the end surface 79 of the first end cap 72. The entire filter element 46 may then be removed through the filter head 32 by pulling the service cover 31. The engagement between lips 69 and end surface 79 is a snap fit. The filter element 46 may be disengaged from the service cover 31 by tapping the element 46 against a rigid surface and moving the projections and lips 69 to an area internal to the first end cap 79 to release the catch. A new filter element may be replaced on the service cover 31 by sliding the service cover 31 inside of the first end cap 72 until the projections and lips 69 slide over the end surface 79. The service cover 31 along with the new filter element may then be reinserted into the housing 38.

Preferably, the service cover 31 is constructed from a plastic material and may typically be of the same material as the housing 38. For example, a glass reinforced polyamide material may be used.

In accordance with the invention, a filtering construction for filtering fluid is mounted within the housing. FIG. 6 illustrates one example of a filter element 46 mounted within the housing 38. Filter element 46 has a cylindrical shape with an outer diameter and an inner diameter. Element 46 also includes an open, first end 70 and an opposite second end 71. Open end 70 is covered by a first end cap 72. First end cap 72 includes an opening to permit access to a filter interior 74, which corresponds to, in the arrangement shown, at least a portion of a filtered liquid volume 73. The filtered liquid volume 73 is defined, at least in part, by the inner diameter of the filter element 46.

Second end 71 of the filter element 46 is covered by a second end cap 75. The second end cap 75 cooperates with a bypass valve assembly and the back pressure flow valve assembly.

Referring to FIG. 6, extending between first end cap 72 and second end cap 75 is a cylindrical extension of filter media 77. Media 77 may be any media sufficient to effectively filter whatever fluid is in the system. The type of media will depend upon what fluid is being filtered, what kind of system the filter is in, and could include other variables. In terms of the principles of operation of the valve assemblies, there is no preference for any particular type of filter media. However, in a typical system, filter media 77 can include a fluted or pleated media. Typically, this may include paper media or cellulose fiber media, sometimes including at least one side treated with polymeric fine fibers or expanded polytetrafluoroethylene (PTFE). Other types of media, including synthetic media, may also be used.

In accordance with the invention, the filtering construction includes a contaminant collection trap mounted thereon. One example of a contaminant collection trap is illustrated in FIG. 6 generally at 82. Contaminant collection trap 82 functions to trap and contain debris which may be knocked off of filter media 77 during change out of the filter element 46. In the particular embodiment illustrated, the trap 82 includes a circular wall 83 defining an open upper edge 84 circumscribing and surrounding filter media 77. The wall 83 is secured to, and typically may be integral with the second end cap 75. The wall 83 is spaced from the media 77 by a distance sufficient to permit contaminant and debris to fall by gravity into and become trapped by the wall 83. Typically, this distance is about from 1 mm to about 2 mm, and typically about 1.5 mm. The trap 82 defines a trap annulus within the circular wall 83 which extends from the open upper edge 84 to the edge 87 of the second end cap 75. Typically, the trap annulus extends about 40 mm to about 47 mm deep.

Spaced between the housing wall 44 and the media 77 is a fluid channel 80, FIG. 6. Fluid channel 80 is for holding the unfiltered fluid, prior to its flowing through media 77. The channel 80 also corresponds to an unfiltered liquid volume 81.

In reference to FIG. 6, a perforated inner liner 78 extends between the first end cap 72 and second end cap 75. Inner liner 78 is generally circumscribed and in intimate contact with the media 77. Preferably, inner liner 78 is constructed of perforated plastic, but can be made of other materials, such as perforated metal, plastic mesh, or metal mesh.

The first end cap 72 and second end cap 75 include the media 77 potted therein by a polymeric binder such as urethane. The end caps 72, 75 are constructed from plastic. Alternatively, end caps 72, 75 could be constructed from metal.

During normal operation, that is, in which a bypass valve is closed and back-flow pressure valve is open, fluid is filtered as follows: Liquid passes through inlet 33 and into conduit 53. It then passes into channel 80 and passes through media 77 of the element 46. The fluid flows into the internal volume 74. From there, the majority of the fluid in internal volume 74 flows through the open back-flow pressure valve, and through the second outlet 40. The back flow pressure valve creates a positive pressure force, which causes a small fraction of the filtered fluid volume to pass through slots between segments 88 in the service cover 31, into the conduit 55 in the filter head and out through the first outlet 35.

III. Back Pressure Flow Assembly

It is often desirable to convey only limited amounts of filtered fluid to downstream components. For example, in the system illustrated in FIG. 1, the sensitive pump 23 requires only a fraction of the volume of the filtered liquid flow through the assembly 30. However, a large input of liquid flows into the assembly 30 to be filtered, since not only the liquid from the sensitive pump 23 ultimately cycles back to the inlet, but also fluid which is being pumped with the main pump 16 out of the tank 12 and into the systems/ users 18. The filter arrangement of the present invention includes a back-flow pressure valve for allowing flow of filtered fluid back to the tank 12 and for creating a positive pressure for conveying a limited quantity of filtered fluid to sensitive downstream components, such as sensitive pump 23.

In the embodiment illustrated in FIG. 6, a back-flow pressure valve includes a first valve assembly shown generally at 85. The first valve assembly 85 is constructed and arranged to selectively open a fluid path between the filtered liquid volume 73 and the second outlet 40. That is, in response to a pressure differential created between the region of the filtered liquid volume 73 and a region 108 defined by a valve head in the first valve assembly 85, the valve assembly 85 moves between a closed position and an open orientation. A biasing member 86 is responsive to the pressure differential created, in order to maintain balance in the system. When the force created by the pressure differential between the filtered liquid volume 73 and the region 108 defined by the valve assembly exceeds the force created by the biasing member 86, the first valve assembly 85 moves from a closed position into an open orientation.

During normal, typical operation of the assembly 30, the pressure differential will be great enough to cause the valve assembly 85 to be in an open orientation.

In the specific embodiment illustrated in FIG. 6, the first valve assembly 85 includes a standpipe 89. The standpipe 89 includes a tubular outer wall 90 in extension from just beyond an outside edge of the second end cap 75 and into the internal volume 74 of the element 46. The tubular outer wall 90 extends a partial length of the overall length of the element 46 between first end cap 72 and second end cap 75.

At a base of wall 90 is a shoulder 92 for abutting and engaging a circular rim 76 integral with the second end cap 75. An O-ring 93 forms a seal between end cap rim 76 and outer wall 90. This prevents fluid from leaking between the filtered liquid volume and the unfiltered liquid volume between the standpipe 89 and the second end cap 75.

The wall 90 is tapered to define a widest diameter at base section adjacent shoulder 92 to a narrowest diameter at end 97. Thus, wall 90 is frusto-conical in configuration in the region between end 97 and shoulder 92. When the element 42 is removed for servicing, the seal formed by the O-ring 93 loosens and breaks as the O-ring 93 slides relative to an increasingly narrower slide surface defined by the wall 90.

The wall 90 defines a plurality of holes 99, FIG. 6. The holes 99 are for draining liquid from the filter element 46 when changing out the filter element 46.

Referring again to FIG. 6, positioned adjacent to shoulder 92 and attached to wall 90 is a second tubular wall 94 having a diameter greater than the diameter of the outer wall 90. Second wall 94 extends from and is integral with housing wall 44. Second wall 94 defines an internal volume 91 therein in fluid flow communication with second outlet tube internal region 43. Second wall 94 defines apertures 95, 96 to provide fluid flow communication between the channel 80 and a region 98.

The wall 90, second tubular wall 94, and housing wall 44 are all integrally molded in a single, unitary structure. Fins 101, FIG. 6, extend from the housing wall 44 to support the standpipe 89, including the walls 90, 94. Alternatively, the standpipe 89 could be removably mounted within the housing.

Positioned within tubular outer wall 90 is a valve head 100 biased against a valve seat 102 by the biasing member 86. In the specific instance depicted in FIG. 6, the biasing member 86 comprises spring 104. The valve head 100 is generally cylindrical (piston-like) in shape and includes a domed-shaped closed portion 106. At the periphery of closed portion 106 is a plurality of apertures 107 providing fluid communication with internal volume 108 formed by the valve head 100. Internal volume 108 is in communication with inner volume 91 formed by the second tubular wall 94. Valve head 100 also includes a cylindrical shaped wall 109 coterminous with the closed portion 106.

In FIG. 6, the valve seat 102 includes a projecting ring 112 normal to tubular outer wall 90 and projecting inwardly therefrom. Projecting ring 112 preferably is integral with the tubular outer wall 90. A central aperture or valve seat port 113 is defined by the ring 112.

In FIG. 6, the first valve assembly 85 is illustrated in a closed orientation. By "closed orientation", it is meant the valve head 100 is biased against the valve seat 102, so that the closed portion 106 is in engagement with the projecting ring 112 and closes the central aperture 113 formed by the projecting ring 112. The spring 104 pushes against the valve head 100, in order to bias the first valve assembly 85 into its closed position. When in the closed position, the internal volume 108 of the valve head 100 is in closing relation to the valve seat port 113.

The first valve assembly 85 also has an open orientation, which is its typical orientation, during normal filtering operation. The "open orientation" includes a range of positions and includes when the valve head 100 is biased away from the valve seat 102 to open the valve seat port 113 and the apertures 107 in the valve head 100 to flow of filtered liquid from the internal volume 74. That is, in an open orientation, the domed closed portion 106 of the valve head 100 is moved out of engagement with the projecting ring 112 to open the central aperture 113. This permits liquid in the internal volume 74 to flow through the valve seat port 113 and through the apertures 107 into the internal volume 108 of the valve head 100. This fluid is then conveyed through the volume 91 and into the second outlet 40.

The wall 90 is constructed of a generally liquid-impervious material, and extends a first length of about 40–70%, typically about 46% of the length of element 46.

The interior of wall 90 defines region 110. Region 110 is in fluid flow communication with, and is part of, the internal filtered liquid volume 73.

During typical, normal operation of assembly 30, the pressure differential between volume 108 inside of valve head 100 and volume 74 inside of filter element 46 results in a force which exceeds the force exerted by spring 104, and the first valve assembly 85 moves from its closed position into an open orientation.

Typically, the first valve assembly 85 is constructed and arranged so that it moves from its closed position at pressures in excess of about 50 kPa.

IV. Bypass Flow Assembly

Should the filter element 46 become substantially occluded, or if there is a cold start or flow surge condition, the assembly of the present invention also includes a system for dealing with these conditions. The arrangement herein senses when such conditions, such as an occluded filter element, a flow surge condition, or a cold start condition are occurring. One way of doing this is through monitoring a pressure differential, and when a force created by the pressure differential exceeds a pre-determined point, allowing the fluid to bypass the filter element 46 and proceed through the second outlet and into the tank. A bypass valve accomplishes these functions.

Referring to FIG. 6, the bypass valve includes a second valve assembly illustrated generally at 120. The second valve assembly 120 includes a bypass valve assembly 121 constructed and arranged to selectively direct fluid flow from the unfiltered liquid volume 81 to the second liquid flow outlet 40, in response to a selected liquid pressure level within the unfiltered liquid volume 81. That is, if the force created by the pressure differential between the channel 80 of the unfiltered liquid volume 81 and the internal volume created by the bypass valve assembly 81 is greater than the force created by a biasing member, the bypass valve assembly moves from its closed position into an open orientation, and permits liquid to flow from the channel 80 into the second outlet 40.

In the specific illustrated embodiment of FIG. 6, the bypass valve assembly 121 includes a second spring loaded valve head 125 and a valve seat 126. The valve head 125 includes an outer side wall 128 with first and second open ends 130, 131. The side wall 128 includes a first section 132 of a first diameter. The diameter of first section 132 is less than the diameter of second wall 94 of the tubular outer wall 90. This way, the first section 132 slidably engages the inner portion of second wall 94. At an end of the first section 132 is an end rim 138 (FIG. 5).

Attached to and adjacent to first section 132 is a second section 133. Second section 133 has a diameter which is smaller than the diameter of first section 132 and of second wall 94, to lie within the internal volume 91 created by wall 94. At end of section 133 is a rim 139. In the FIG. 6 embodiment, rim 139 is touching, abutting, and engaging the valve seat 126.

Figure 5:
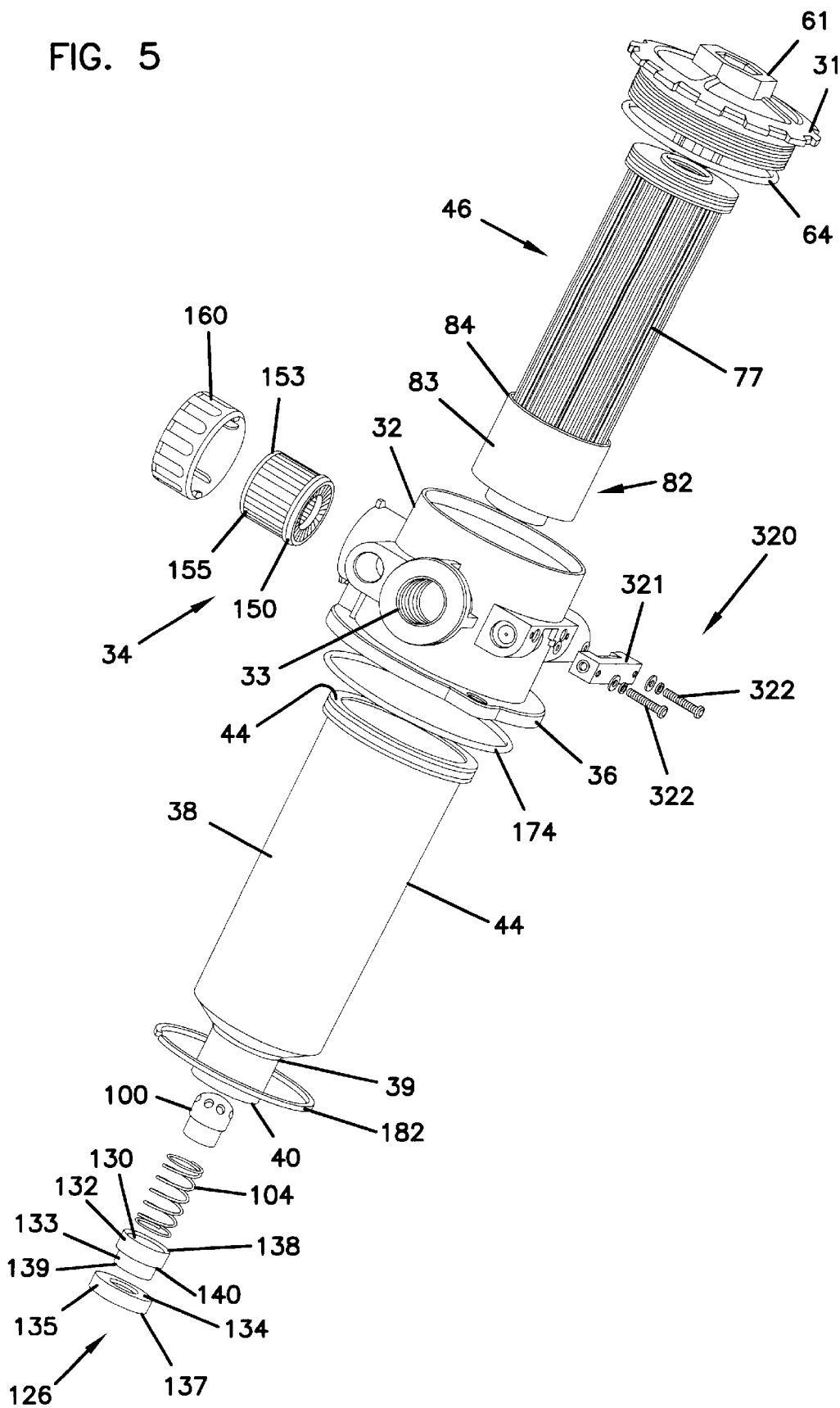
FIG. 5 is an exploded view of a filter head and housing, according to the present invention.

At the intersection of first section 132 and second section 133 is a pressure shoulder 140 (FIG. 5). Pressure shoulder 140 functions to direct fluid pressure build up within the unfiltered liquid volume against a direction of force from the spring 104.

Referring now to FIG. 5, adjacent to second section 133 is the valve seat 126. In this particular embodiment, valve seat 126 includes a stop ring 137 having a stop surface 134. Stop surface 134, when oriented in the assembly, extends generally normal to second section 133. Adjacent to and integral with stop surface 134 is third section 135. Third section 135 has a diameter which is greater than the diameter of first and second sections 132, 133 and of second wall 94. Therefore, the rim 139 engages and abuts the stop surface 134 to form the valve seat 126.

The first section 132, second section 133, third section 135, second wall 94, and tubular outer wall 90 are all coaxially aligned with the central longitudinal axis 37 (FIG. 6) of the element 46.

Turning back again to FIG. 6, as described previously, second wall 94 includes apertures 95 and 96. These apertures 95, 96 allow fluid to flow from channel 80 into region 98 (FIG. 7), which is between the second section 133 and the second wall 94. The sidewall 128 defines an internal volume 129. Internal volume 129 is in fluid communication with internal volume 91 formed by second wall 94, and with region 43 defined by the second outlet 40.

Figure 7:
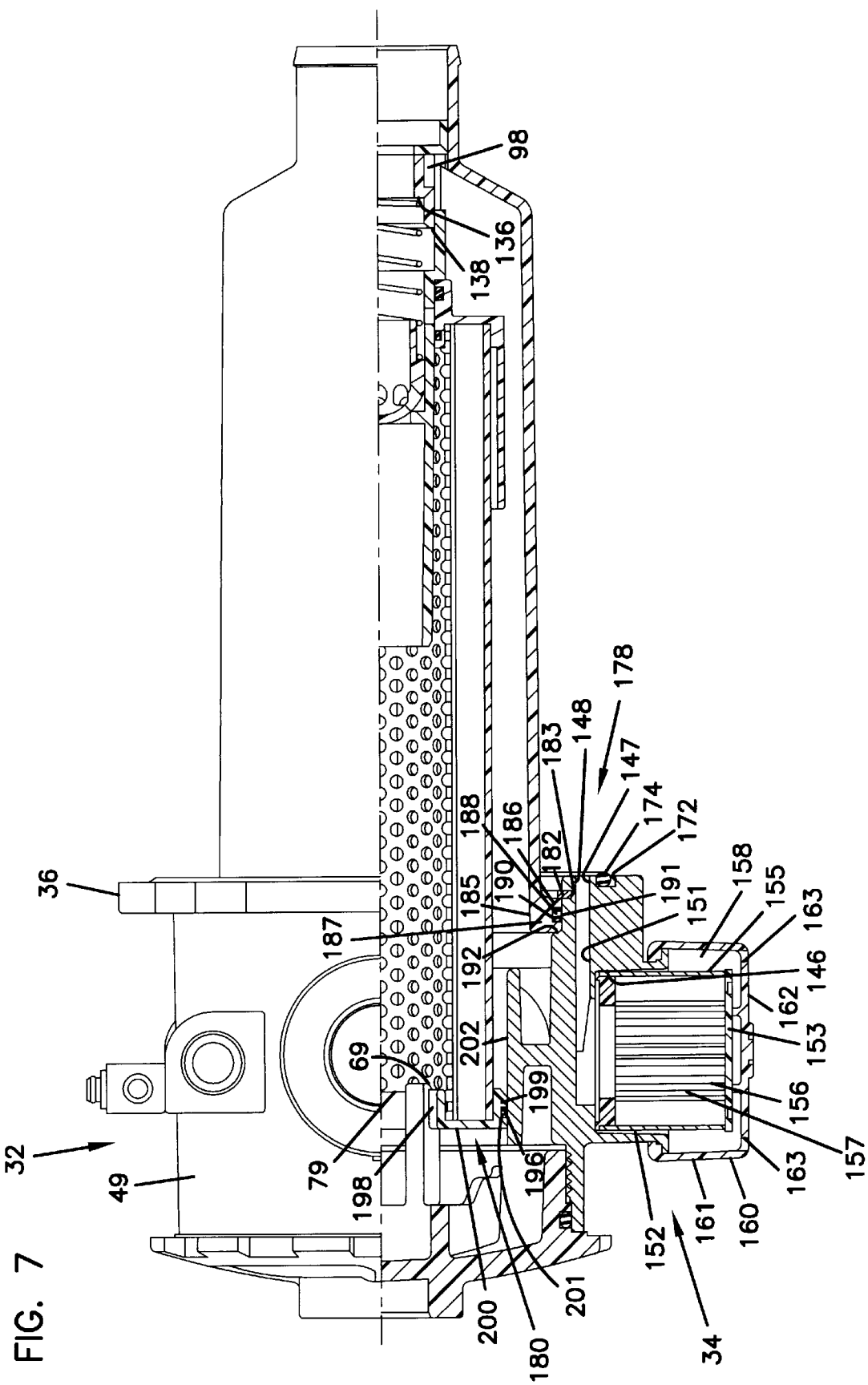
FIG. 7 is a cross-sectional view taken along the line 7—7 of FIG. 3, analogous to FIG. 6 but rotated 90°, according to the present invention.

At the intersection of first section 132 and second section 133 is a spring seat 136 (FIG. 7). Seat 136 holds a biasing member for biasing the bypass valve assembly 121 into its closed position, illustrated in FIG. 6. In the arrangement shown, the biasing member comprises the spring 104, which is also the same biasing member acting on the first valve assembly 85. Alternatively, a second and separate biasing member could act separately on the second valve assembly 120. However, the arrangement illustrated is convenient, as it minimizes the number of parts required. The spring 104 includes a diameter which is smaller than the diameter of the first section 132, but larger than the diameter of second section 133. In this manner, it is able to fit within the ring created by first section 132 and engage the seat 136 at the intersection of the first and second sections 132, 133. The spring 104 biases the valve head 105 in a direction toward the service cover 31 and away from the a second outlet 40.

As the pressure in the channel 80 increases, for example, if the media 77 is occluded, pressure begins to build on shoulder 140. When the force created by the pressure differential between the unfiltered liquid volume 81 in channel 80 and volume 129 exceeds the force created by spring 104, the valve head 125 moves from its closed position to an open orientation. The closed position is illustrated in FIG. 6. The closed position includes the rim 139 in touching engagement with the stop surface 134; that is, the valve head 125 is seated within its valve seat 126. As pressure on pressure shoulder 140 builds and eventually creates a force which exceeds the spring 104 force, the valve head 125 moves within and the first section 132 slidably engages the inner portion 116 of the second wall 94. Eventually, the rim 139 will move away from, and outside of touching engagement with, the stop surface 134. This creates fluid communication between unfiltered liquid volume 81, volume in region 98, and volume 129 within the side wall 128. Liquid in the unfiltered liquid volume 81 is then allowed to flow through the region 98 into the volume 129 and through the second outlet 40. From there, it preferably flows into the tank 12, FIG. 1.

Typically, the second valve assembly 120 is constructed and arranged to move from its closed orientation to its open orientations at pressures in excess of about 120–180 kPa, typically about 150 kPa. It should be noted that, in the preferred arrangement, the same spring 104 is used for both the first valve assembly 85 and second valve assembly 120. The first and second valve assemblies 85, 120 move responsive to different pressures, due to different areas on their respective valve heads exposed to the fluid pressure.

When the bypass valve assembly 121 is in its open orientation, the components downstream to the first outlet 35 are not allowed to cavitate. That is, an arrangement is provided to convey liquid as needed to the first outlet 35, even when the bypass valve assembly 121 is open. Specifically, a check valve may be provided outside of the assembly 30 to convey liquid to the sensitive pump 23.

V. Breather Filter Assembly

In accordance with the invention, a breather filter is provided. In FIG. 7, one example of a breather filter is shown generally at 34. The breather filter 34 is constructed and arranged to clean air which is taken into the tank 12. The breather filter 34 also allows for the exhaust of air from the tank 12. In the particular embodiment illustrated, the breather filter 34 includes an element 155 defining an internal volume 156. The element 155 is tightly engaged within a cylindrical bore 152, defined by the filter head 32. It is sealed within bore 152 by a radial seal 146 formed between an end cap 150 and the bore 152. The element 155 is positioned within bore 152, such that the internal volume 156 is in fluid flow communication with a channel 151, defined by the filter head 32. The breather filter 34 also includes filter media 157 in extension between opposite end caps 150, 153. The media 157 may typically include a mesh screen, for example, a 100 mesh screen. This functions to keep large particles from entering the tank 12. Other types of media may also be used, depending on the application and environment. For example, cellulose or paper media may also be used.

In reference to FIG. 7, breather filter 34 is mounted within the filter head 32. The filter head 32 includes a wall 147 and a wall 148 generally parallel to walls 52 and 56. Walls 148 and 149 are spaced apart from each other to define the open channel 151. Channel 151 is in fluid flow communication with the internal volume 156 of the breather filter 34. The wall 147 forms the cylindrical bore 152, for mounting the breather filter 34. Typically, cylindrical bore 152 is located 90 degrees in rotation from the cylindrical bore 48 of inlet 33 and cylindrical bore 54 of first outlet 35. Each of the cylindrical bores 48, 54, and 152 includes a longitudinal axis therethrough which intersect at a point corresponding to the longitudinal axis 37 (FIG. 6) of the filter element 46.

A cover member 160 engages the wall 147 and covers the breather filter element 155. The cover member 160 includes a cylindrical sidewall 161 and an end wall 162. The end wall 162 defines apertures 163 providing fluid flow communication between the region 158 and the external environment. The cover member 160 is constructed from plastic, but may also be constructed from metal.

VI. Mounting Arrangement

The filter head and housing assembly 30 may be mounted within a tank, such as the tank 12 illustrated in FIG. 1. A mounting arrangement is generally provided in the assembly 30 to conveniently mount the assembly on the tank. The flange 36 is constructed arranged to provide for a releasable attachment to the tank. In the example illustrated in FIG. 4, the flange 36 defines a mounting bore 170 extending through the flange 36. The mounting bore 170 receives a bolt, or other suitable connector, in order to mount the assembly 30 to the tank 12 (FIG. 1).

In reference to FIG. 7, the bottom surface of the flange 36 defines a circular groove 172. The circular groove 172 lies between the mounting bore 170 and the wall 49 of the filter head 32. The circular grove 172 is outside of the channel 151 formed by the walls 147, 148. The groove 172 receives a circular O-ring 174 therein. The circular O-ring 174 provides a seal between the filter head 32 and the tank 12. The channel 151 is therefore sealed from the external environment by the O-ring 174.

An attachment arrangement is provided to attach the filter housing 38 to the filter head 32 and is constructed and arranged to provide a convenient and secure attachment, while minimizing vibration. The housing 38 is preferably attached to the filter head 32 at least first and second engagement portions 178, 180.

In the particular embodiment illustrated in FIG. 7, first engagement portion 178 includes a snap ring 182 seated within a groove 183 in the filter head 32. The housing wall 44 includes an end 185 with a first and second circular flange 186, 187 defining a groove 188 therebetween. Groove 188 holds an O-ring 190 for matably engaging an inner wall surface 191 of the filter head 32. The bottom of the first flange 186 engages and abuts the snap ring 182. The top of the second flange 187 engages in abuts a shoulder 192 formed along the inner wall surface 191 of the filter head 32. Therefore, the first engagement portion 178 provides for a secure and sealed attachment between the housing wall 44 and the filter head 32.

The second engagement portion 180 provides for a sealed attachment between the filter element 46 and the filter head 32. In the particular embodiment illustrated in FIG. 7, the second engagement portion 180 includes an O-ring 196 seated within a groove of the first end cap 72 (FIG. 6). Specifically, the first end cap 72 includes an inner cylindrical wall 198 an outer cylindrical wall 199 generally parallel to the inner wall 198, and a top wall 200 extending between the inner wall 198 and outer wall 199. The outer wall 199 is the wall which defines a circular groove 201. The circular groove 201 receives the O-ring 196. The outer wall 199 of the end cap 72 lies between the filter element media 77 and the interior wall portion 202. The interior wall portion 202 is a wall surface which is opposite to the wall member 52 and wall member 56. The O-ring 196 therefore seals between the first end cap 72 and the interior wall portion 202. This prevents unfiltered liquid in the channel 80 from penetrating into the fluid path of the filtered liquid.

In FIG. 7, inner wall 198 engages cylindrical wall 66 of the service cover 31. This engagement helps to provide the secure attachment and stability to the arrangement.

VII. Indicator Arrangement

An indicator arrangement is shown in FIG. 5 at 320. The indicator arrangement functions to sense pressure differentials within the assembly 30. Specifically, the indicator arrangement 320 includes a mechanical sensor 321, having a coiled spring and a slide press indicator. The sensor 321 is attached to the exterior of the housing 38 with mounting bolts 322. In addition, an electronic indicator, such as that described in U.S. Pat. No. 4,480,160, hereby incorporated by reference, could also be used.

VIII. Example Operation

When assembled as described above, the assembly 30 operates as follows:

Liquid enters the assembly 30 through a liquid flow inlet path, shown by arrows 204, FIG. 6. The liquid flow inlet path includes through the bore 48 in inlet 33, through the conduit 53, and into the channel 80, where it becomes part of the unfiltered liquid volume 81.

The unfiltered liquid passes through media 77 in element 46 to internal volume 74, where it becomes part of the filtered liquid volume 73. When the pressure differential between volume 108 inside of valve head 100 and volume 74 inside of filter element 46 results in a force which exceeds the force exerted by spring 104, the first valve assembly 85 moves from its closed position into an open orientation. When the first valve assembly 85 is in an open position and the second valve assembly 120 is in a closed position, the majority of the liquid travels in a second liquid flow path, shown by arrows 208, FIG. 6. The second liquid flow path 208 flows from the filtered liquid volume 83, through the valve seat port 113, into the internal volume 108, and into the interior region 43 of second outlet 40. From there, it may be returned to the tank 12, FIG. 1.

The first valve assembly 85 creates a positive pressure, which forces a fraction of the liquid to follow a first liquid flow outlet path, shown by arrows 206, FIG. 6. The first liquid flow outlet path 206 includes from the filtered liquid volume 73, through the bore 67, through the space 58, through the conduit 55, and out through the bore 54 in the first outlet 35. From there, it travels to components, such as sensitive pump 23, FIG. 1.

If a force created by the pressure differential between the unfiltered liquid volume 81 and volume 129 created by the second valve assembly 120 exceeds the force exerted by the biasing member 86 of the second valve assembly 120, the second valve assembly 120 moves against the biasing member 86 into an open orientation. When the second valve assembly 120 is in the open orientation, liquid in the unfiltered liquid volume 81 follows a third liquid flow outlet path, shown at arrows 210, FIG. 6. The liquid flows from unfiltered liquid volume 81, through apertures 95, 96, through volume 98, through volume 129, and into interior region 43 of the second outlet 40. From there, it may be returned to the tank 12, FIG. 1.

IX. Example Filter Element Change

The assembly of the preferred embodiment shown in the figures provides for a convenient and quick change-out of the filter element. One example of a method for changing the filter element 46 within the housing 38 is as follows:

The service cover 31, FIG. 3, is detached from the filter head 32. In the example illustrated, the service cover is unattached by rotating the service cover 31 relative to the filter head 32. This disengages the threaded mating between the service cover 31 and filter head 32 to unscrew the service cover 31 from the filter head 32. A tool may be used to facilitate the disengagement between the threads. For example, the service cover 31 shown in FIG. 4 includes hexnut extension 61, which may be gripped by a wrench and rotated. By unattaching the service cover 31 from the filter head 32 the fluid seal 65 created by the O-ring 64 between the service cover 31 and filter head 32 is broken.

After the service cover 31 has been disengaged or detached from the filter head 32, the filter element 46 may be removed from the housing 38. Specifically, the service cover 31 is grasped and pulled upwardly relative to the housing 38. By pulling the service cover 31, the filter element 46 is moved, due to the connection between the service cover 31 and the element 46 at lip 69 and end surface 79. Therefore, the pulling surface on service cover 31 also pulls the element 46 to remove the element 46 from the interior of the housing 38. The element 46 is removed from the housing 38 by pulling it through the central aperture defined by the bore 47 in the filter head 32. As the filter element 46 is being removed from the housing 38, the seal created by the O-ring 93 between the second end cap 75 and the stand pipe 89 is broken.

This is because the O-ring 73 is slid relative to the stand pipe 89, which is conical in shape and tapers from a wide portion at the shoulder 92 to a narrow portion at the end 97. Therefore, as the O-ring 93 slides relative to the stand pipe 89, the compressive force between the O-ring 93 and the outer wall 90 of the stand pipe 89 becomes less or weaker to reduce the drag or friction between the O-ring 93 and the standpipe 89. The seal created by O-ring 196 between the first end cap 72 and the interior wall portion 202 of the filter head 32 is broken when the filter element 46 is pulled out from engagement with the interior wall portion 202 of the filter head 32.

As the filter element 46 is removed, holes 99 in stand pipe 89 are exposed. This helps to drain the liquid from the element 46.

As the filter element 46 is removed from the housing 38, debris and contaminant may be loosened and knocked from the surface of the media 77. As this happens, the trap 82 catches the debris and contaminant to prevent it from falling into the liquid within the housing 38. Specifically, the debris falls in the region between the wall 83 and the upstream surface of the filter media 77.

Once the filter element 46 is completely removed from the housing 38, the user will be holding the service cover 31 which is attached to the filter element 46 through the lip 69 of the service cover 31 and the end surface 79 of the first end cap 72. The filter element 46 is then removed from the service cover. This may be accomplished by tapping the filter element 46 from the service cover 31 to disengage the snap connection at lips 69 and end surface 79. The filter element 46 may then be discarded.

A new, second filter element may then be attached to the service cover 31. The second filter element is engaged by placing the inner cylindrical wall 66 of the service cover 31 in the open aperture defined by the first end cap, analogous to end cap 72 of the filter element 46. The inner cylindrical wall 66 is slid in the aperture defined by this end cap until the lip 69 of the cylindrical wall 66 snaps over and catches the end surface 79 of the first end cap.

The second filter element and service cover 31 may then be replaced in the assembly. To accomplish this, the new, second filter element is inserted through the aperture defined by the bore 47 of the filter head 32 and into the interior region of the housing 38 within the housing wall 44. The second filter element includes the service cover 31 attached thereto. As the second filter element is inserted within the housing 38, an O-ring analogous to O-ring 93 engages and slides relative to the tubular outer wall 90 of the stand pipe 89. As the O-ring is moved further down closer to the end opposite from the filter head 32, the diameter of the stand pipe 89 is greater. Eventually, the rim 76 abuts the shoulder 92 to properly engage the second element within the housing 38. A seal is created between the O-ring 93 and the wall 90 of the stand pipe 89. A seal is also created between the O-ring 196 in the first end cap 72 and the interior wall portion 202 of the filter head 32.

The service cover 31 is then reattached to the filter head 32. In the example illustrated, this is accomplished by screwing the service cover 31 to the filter head 32. That is, the service cover 31 is rotated to threadably engage the threads in the filter head 32. A seal 65 is created by the O-ring 64 between the service cover 31 and the filter head 32, when the service cover 31 is fully matably engaged with the filter head 32. A tool such as a wrench may be used to grasp the hexnut extension 61 to assist with tightening the service cover 31 to the filter head 32.

X. A Specific Preferred Embodiment

It will be understood that a wide variety of specific configurations and applications are feasible, using techniques described herein. In this section, a particular fluid filter arrangement with a back pressure flow valve arrangement and a bypass flow valve arrangement will be described.

The filter element 46 has a length of about 210 mm. It has an outer diameter for both end caps of about 63 mm. The inner diameter of both end caps is about 30 mm.

The housing 36 has an outer diameter of 81 mm at the end connected to the filter head. It has a length of about 225 mm. The housing has an outer diameter at the second outlet 40 of about 40 mm.

The stand pipe has a length of about 110 mm. The length of the stand pipe is about 50% of the housing length, and about 53% of the element length. The stand pipe has an outer diameter at end 97 of about 23 mm. The stand pipe has an outer diameter at the second wall 94 of about 35 mm.

The bypass valve has a length at the first section 132 of about 9 mm, an outer diameter of about 27 mm, and an inner diameter of about 23 mm. The second section 133 of the bypass valve has a length of about 9 mm, an outer diameter of about 23 mm, and an inner diameter of about 20 mm. The third section 135 has a length of about 8 mm, an outer diameter of about 36 mm, and an inner diameter of about 32 mm. The surface area of the bypass valve in cooperation with the spring is set to move the bypass valve from a closed orientation to an open orientation at pressures in excess of from about 150 kPa to about 180 kPa.

The back pressure flow valve has a valve head 100 with an outer diameter of about 23 mm and a length of about 27 mm. The surface area of the valve head in cooperation with the spring constant sets the back pressure flow valve to move from its closed orientation to an open orientation at pressures in excess of about 50 kPa.

Figure 8:
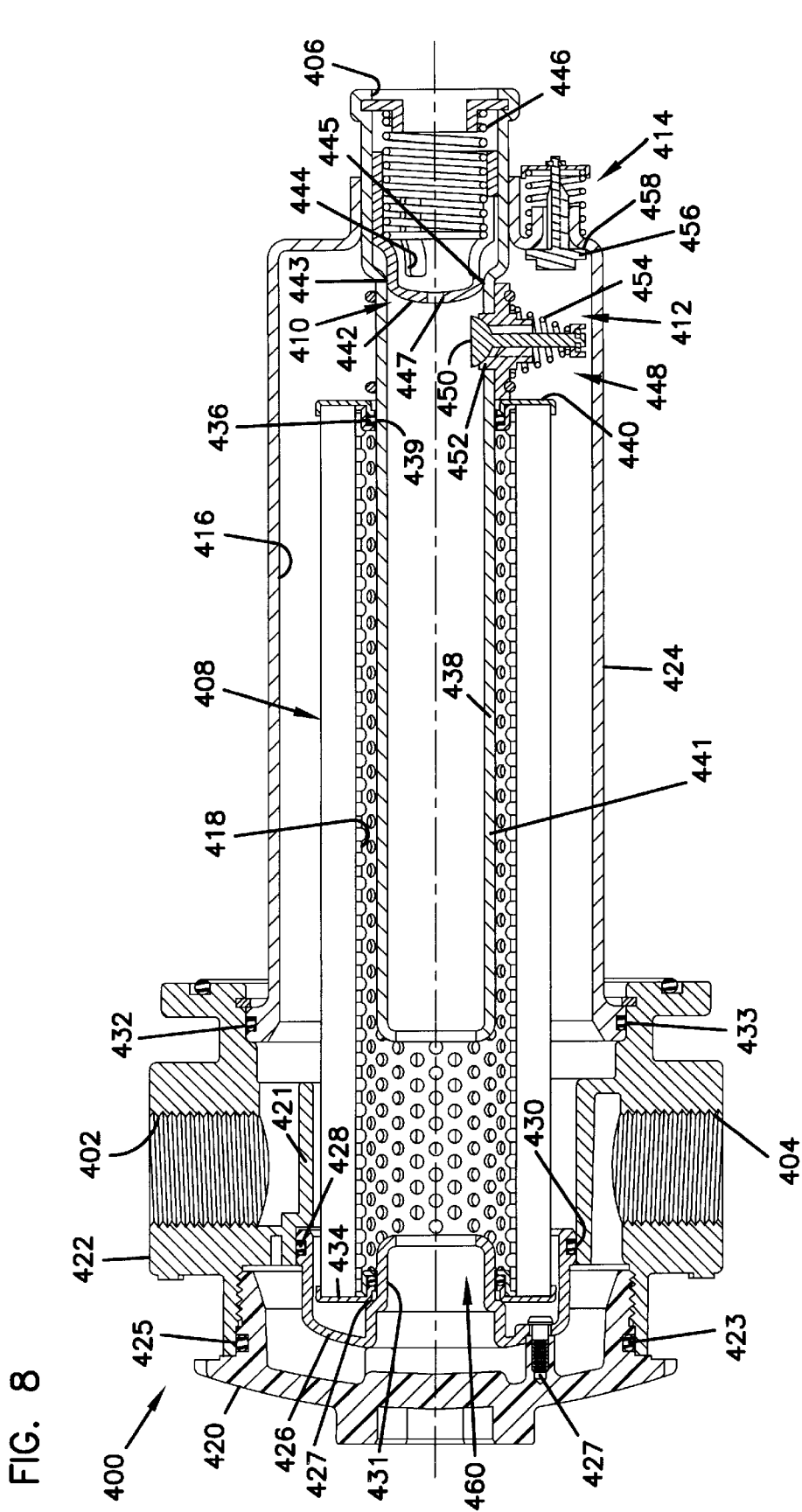
FIG. 8 is a cross-sectional view analogous to the view taken along the line 6—6 of FIG. 3, illustrating an alternative embodiment, according to the present invention.
Figure 9:
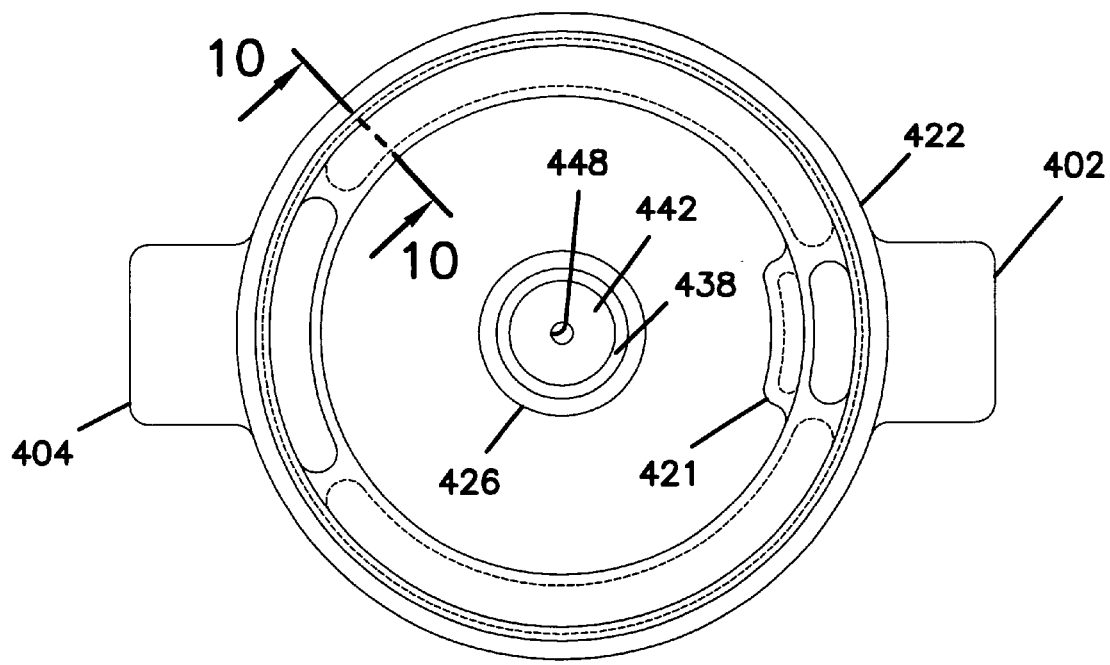
FIG. 9 is a schematic, top plan view of the filter head and without a cover assembly and an element of the embodiment shown in FIG. 8.
Figure 10:
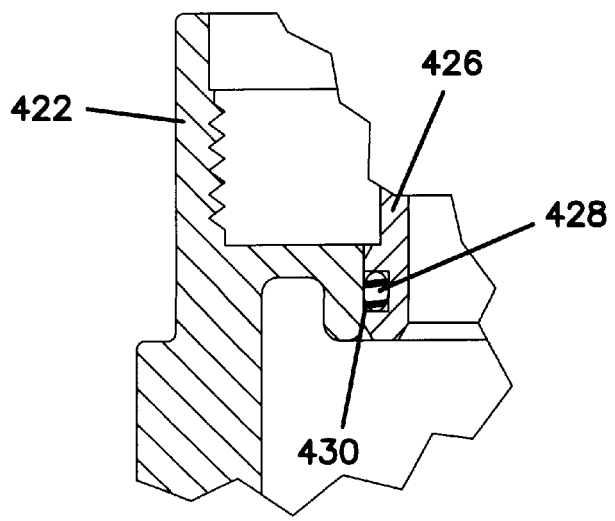
FIG. 10 is a schematic, fragmented, somewhat enlarged cross-sectional view taken along the line 10—10 of FIG. 9.

XI. Alternate Embodiment. FIGS. 8–10

In reference to FIGS. 8 and 9, an alternative embodiment of a filter assembly for use in an in-tank arrangement is illustrated generally at 400.

A. Principles of Operation

In FIG. 8, a schematic, cross-sectional view analogous to the illustration in FIG. 6, is depicted. The filter assembly 400 includes an inlet 402; an aspiration outlet, or first outlet 404; and a return-to-tank outlet or second outlet 406. A cylindrical filter element 408 is part of assembly 400 and provides filtering of fluid passing therethrough. The assembly 400 also includes a back pressure valve 410 in fluid flow communication with the second outlet 406; a bypass valve 412; and a reverse flow check valve 414.

During normal operation, fluid flows through inlet 402 and into an annular space 416, where it becomes part of an unfiltered liquid volume. The fluid then passes through filter element 408 and into an open filter interior 418, where it constitutes part of a filtered liquid volume. During normal operation, the pressure differential is sufficient to maintain the back pressure valve 410 in an open orientation. The majority of the liquid from the filtered liquid volume flows through the open back pressure valve 410, through the second outlet 406 and to components such as a tank. The back pressure valve 410 creates a positive pressure on the liquid in the filtered liquid volume and causes a fraction of the liquid in the filtered liquid volume to flow through the first outlet 404. From the first outlet 404, the liquid flows to components such as a sensitive pump.

If the filter element 408 becomes occluded, the bypass valve 412 moves from its closed orientation, as illustrated in FIG. 8, to an open orientation. The open orientation permits liquid from the unfiltered liquid volume to flow into the filtered liquid volume and pass through the open back pressure valve 410 and through the second outlet 406.

If an unusual situation occurs upstream from the assembly 400, the reverse flow check valve 414 is provided to ensure that the components downstream of the first outlet 404, such as a sensitive pump, are not cavitated. For example, if there is an insufficient quantity of liquid in the filtered liquid volume, and liquid is not being conveyed through the first outlet 404, vacuum pressure through first outlet 404 will cause the reverse flow check valve 414 to open. When the reverse flow check valve 414 is opened, a liquid flow inlet path is opened to draw liquid from the tank, through an inlet, into the annular space 416, through the filter element 408, and then through the first outlet 404.

B. Overall Assembly

With the principles of operation in mind, we next turn to a detailed description of the components of the assembly 400.

In reference again to FIG. 8, a service cover 420 is illustrated at one end of the assembly. Service cover 420 is analogous to service cover 31, described above in connection with the embodiment of FIGS. 3–7.

A filter head 422 is shown threadably attached to the service cover 420. An O-ring 423 provides a seal 425 between the head 422 and the cover 420. The filter head 422 defines the inlet 402 and the first outlet 404. A baffle 421 projects downstream of the inlet 402, to protect the filter element 408 from a direct impact of liquid flowing therein. Filter head 422 is analogous to the filter head 32, described above.

In FIG. 8, a housing wall 424 is shown surrounding the filter element 408, and is analogous to wall 44, FIG. 6. It is secured to filter head 422.

Still referring to FIG. 8, a cup 426 is affixed to service cover 420 through, for example, studs 427. Cup 426 seals off conventionally arranged inlet flow patterns, and allows filtered fluid to pass up, over, and down to the first outlet 404. Cup 426 defines an outlet port 431 for the passage of filtered liquid from the filtered liquid volume to the first outlet 404.

Figure 11:
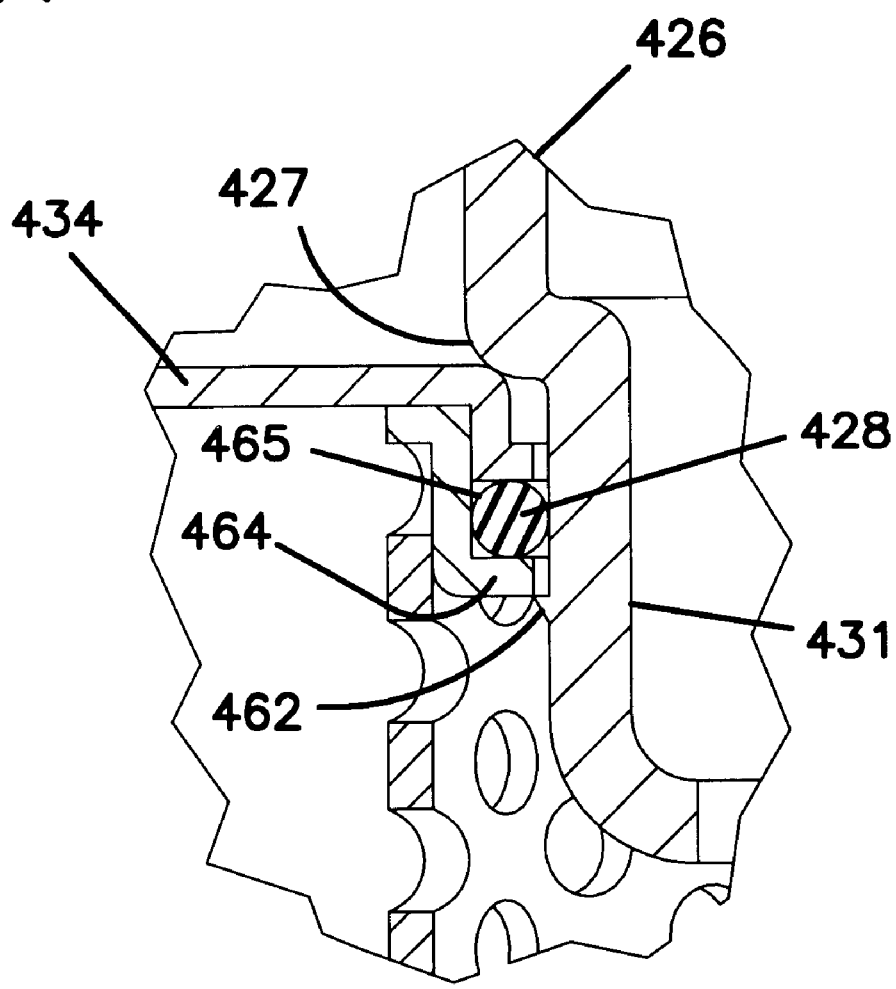
FIG. 11 is a schematic, fragmented, enlarged cross-sectional view of a portion of FIG. 8.

Cup 426 interlocks with the filter element 408, to allow for a convenient method of changing out the element 408. In the specific example illustrated, cup 426 defines an annular rim or shoulder 427. Shoulder 427 engages a first end cap 434 of the element 408. The outer diameter of shoulder 427 is greater than the inner diameter of the end cap 434. As can be seen in FIG. 11, cap 426 defines a barb 462. When changing out the filter element 408, the barb 462 moves from its position below lower rim 464 of O-ring seat 465 (FIG. 11), and engages an O-ring 428. The engagement between the barb 462 and O-ring 428 nested within end cap 434 in seat 465 allows a pulling force exerted on the service cover 420, which is attached to cup 426, to translate to a pulling force on the element 408. Further details on changing out the filter element are explained below.

Cup 426 may be constructed from either a nylon or cast aluminum material.

A sealing system is provided to ensure a fluid-tight separation between the filtered liquid volume and unfiltered liquid volume. In the illustrated embodiment in FIG. 10, the first O-ring 428 forms a first radial seal 430 between the filter head 422 and the cup 426. In FIG. 8, a second O-ring 432 provides a second radial seal 433 between the cup 426 at outlet port 431 and a first end cap 434 of the filter element 408.

A third O-ring 436, FIG. 8, is situated between a standpipe 438 and a second element end cap 440, and provides a third radial seal 439 to prevent the flow of unfiltered liquid into the open filter interior 418.

In reference again to FIG. 8, the standpipe 438 includes a generally open, cylindrical member 441, extending a length from within the open filter interior 418, through an end of the housing 424 to define the second outlet 406. The standpipe 438 helps to prevent or eliminate contamination of the filtered liquid when changing out the element 408. Specifically, the standpipe 438 has a length which is sufficient such that unfiltered fluid will not be higher than the top of the standpipe 438 at any phase of the changeout cycle.

Referring again to FIG. 8, the back pressure flow valve 410 is provided in the assembly 400, and is constructed and arranged to create a force causing a fraction of the filtered liquid to flow through the aspirated, or first outlet 404, to supply sensitive components. This way, the back pressure flow valve 410 helps to creates a charge of always filtered liquid for sensitive components downstream of the first outlet 404.

As illustrated in FIG. 8, the back pressure flow valve 410 includes: a valve head 442, positioned within a valve seat 443 (defined by the standpipe 438); and a biasing member or spring 446. The valve head 442 is piston-shaped, and defines a plurality of apertures 444. In a closed position, shown in FIG. 8, the spring 446 biases the valve head 442 into and against the valve seat 443, to form a seal 445 between the valve head 442 and the valve seat 443.

When the pressure differential between the liquid volume inside of valve head 442 and the filtered liquid volume inside of filter element 408 results in a force which exceeds the force exerted by spring 446, the back pressure flow valve 410 moves from its closed position into an open orientation. When in an open orientation, the valve head 442 is spaced away from the seat 443, breaking the seal 445. When the seal 445 is broken, liquid is allowed to flow from the filtered liquid volume in the open filter interior 418 and in the standpipe 438, through the apertures 444, and through the second outlet 406 where it is returned to, for example, a tank.

The resistance of the spring 446 against the flow of liquid causes a positive pressure within the interior of the standpipe 438 and in the filtered liquid volume. This positive pressure causes a constant flow of filtered liquid through the first outlet 404.

In typical operation of the assembly 400, the flow through first outlet 404 shall always be less than the minimum inlet through port 402, so that flow is always passing through the back pressure flow valve 410, thus assuring the positive pressure to first outlet 404.

Still referring to FIG. 8, the valve head 442 defines a central, drainage hole 447. The hole 447 defines an area sufficient to facilitate the changing out of the filter element 408 to prevent contamination of the filtered liquid with the unfiltered liquid. Specifically, when the cover 400 is backed out sufficient to admit air into zone 460, the filtered liquid in the standpipe 438 drains through the hole 447 back to the tank, along with the filtered liquid above the top of the standpipe 438. As the element 408 is lifted upward, the filtered liquid between the outlet of the element 408 and the outside of the standpipe 438 will be driven upward and spill into the standpipe 438. The displacement of the volume of the filter element 408 allows the unfiltered liquid volume to settle below the level of the standpipe 438.

When inserting a clean element, the O-ring 436 will form seal 439 around the standpipe 438. As the element continues to be lowered into the housing 424, wiper action of the seal 439 will keep the residual, unfiltered liquid from flowing into the filtered liquid volume.

Again in reference to FIG. 8, the assembly 400 includes an occluded element relief arrangement 448 to protect the element 408 from rupture. The relief arrangement includes the bypass valve 412. The bypass valve 412 comprises a valve head 450 biased against a valve seat 452 in a hole in the standpipe 438. As shown in FIG. 8, the bypass valve is oriented radially, relative to the standpipe 438. A spring 454 is positioned against the valve seat 452, and functions to bias the valve head 450 in sealing engagement with the valve seat 452, corresponding to its closed orientation.

When the pressure differential across the element 408 becomes sufficiently large to overcome the force exerted by the spring 454, the bypass valve 412 moves into an open orientation. Specifically, valve head 450 moves away from the valve seat 452, breaking the seal, to permit the flow of liquid from the unfiltered liquid volume in annular space 416 to the filtered liquid volume in the interior of the standpipe 438.

In the preferred embodiment illustrated in FIG. 8, the bypass valve 412 is positioned adjacent to and downstream of the element 408, and upstream of the back pressure flow valve 410. This arrangement has advantages. For example, the relative positioning of the bypass valve 412 and the element 408 allows the bypass valve 412 to reference the pressure differential across the element 408 directly. In addition, because the bypass valve 412 is upstream of the back pressure flow valve 410, the liquid flow through the bypass valve 412 adds to the flow through the back pressure flow valve 410, to help ensure that the back pressure flow valve 410: maintains an open orientation; and continuously creates back pressure to maintain the supply of filtered liquid through the first outlet 404.

When the bypass valve 412 is in an open orientation, unfiltered liquid flowing into the standpipe 438 does not contaminate the filtered liquid flowing through the first outlet 404. This is because any particles flowing into the standpipe 438 through the bypass valve 412 do not flow against the stream of fluid flowing through the back pressure flow valve 410.

In certain special cases, it may be desirable to ensure that in an event of absence of flow through the filter assembly 400 in the normal, typical manner, flow is maintained to sensitive downstream components through the first outlet 404. The assembly 400 provides for such a feature through the reverse flow check valve 414.

In FIG. 8, the reverse flow check valve 414 is illustrated. It comprises a valve head 456 spring-biased against a valve seat 458. The check valve 414 is positioned in an aperture defined by the bottom of the housing 424. The check valve 414 is shown in FIG. 8 in a closed orientation. In an open orientation, the valve head 456 is spaced away from the valve seat 458, permitting the flow of liquid from the tank or reservoir into the annular space 416.

Preferably, the check valve 414 is designed to open at low pressure differentials, for example, about 1–1.5 psi. If an unusual circumstance arises, stopping the normal flow of liquid into the assembly 30, the components downstream of the first outlet 404 will create a vacuum pressure throughout the filter interior 418. When the force outside of the assembly 400 (i.e., in a tank, for example) resulting from the pressure differential between the inside and outside of the assembly 400 exceeds the force of the spring in the check valve 414, the check valve 414 opens. When in an open orientation, the check valve 414 allows liquid to be drawn directly from the tank or reservoir. From there, the liquid flows through the element 408 and is filtered by the media. The filtered liquid then flows through the first outlet 404, and to sensitive downstream components.

The above specification, examples and data provide a complete description of the manufacture and use of the invention. Many embodiments of the invention can be made without departing from the spirit and scope of the invention.

We claim:

1. A liquid filter assembly comprising:
   (a) a filter head;
   (b) a filter housing comprising an elongate, generally cylindrical wall having housing first and second, opposite ends;
      (i) said housing first end being secured to said filter head;
      (ii) said housing second end being positioned remote to said filter head and including said second liquid flow outlet therein; said filter head and filter housing in combination defining:
         (A) a liquid flow inlet path;
         (B) a first liquid flow outlet path; and,
         (C) a second liquid flow outlet path;
   (c) a filter media construction positioned within said housing;
      (i) said filter media construction comprising:
         (A) a cylindrical extension of media defining a filter media internal volume;
         (B) first and second end caps with said cylindrical extension of media extending therebetween;
            (1) said first end cap having an open central aperture in fluid flow communication with said filter media internal volume and said first liquid outlet flow path;
            (2) said second end cap having an open central aperture with a first valve assembly positioned therein;
         (C) said filter media internal volume comprising a filtered liquid volume;
      (ii) said filter media construction, in combination with said housing, defining:
         (A) an unfiltered liquid volume; and,
         (B) said filtered liquid volume;
   (d) a liquid flow inlet in said filter head;
      (i) said liquid flow inlet path being constructed and arranged to direct liquid from said liquid flow inlet to said unfiltered liquid volume;
   (e) a first liquid flow outlet in said filter head;
      (i) said first liquid flow outlet path being constructed and arranged to direct liquid flow from said filtered liquid volume to said first liquid flow outlet;
   (f) a second liquid flow outlet in said housing;
      (i) said second liquid flow outlet path being constructed and arranged to direct liquid flow from said filtered liquid volume to said second liquid flow outlet;
   (g) a first valve assembly constructed and arranged to selectively open said second liquid flow outlet path to passage of liquid therethrough to said second outlet in response to a first selected liquid pressure level within said filtered liquid volume; and,
   (h) a second valve assembly; said second valve assembly comprising a first by-pass valve assembly constructed and arranged to selectively direct fluid flow from said unfiltered liquid volume to said second liquid flow outlet, in response to a second selected liquid pressure level within said unfiltered liquid volume.

2. A liquid filter assembly according to claim 1 wherein:
   (a) said first valve assembly comprises a tubular outer wall including, positioned therein:
      (i) a first spring loaded valve head; and,
      (ii) a first valve seat having a flow port extending therethrough;
   (b) said spring loaded valve head having a central, closed portion and a peripheral open portion;
      (i) said first valve assembly, when in a closed orientation, having said valve head biased against said valve seat, by a first spring member, such that said central closed position of said valve head is in closing relation to said valve seat flow port;
      (ii) said first valve assembly, when in an open orientation having said valve head biased away from said valve seat thereby opening both of said valve seat flow port and said peripheral open portion of said valve head, allowing flow of filtered liquid from said filter media internal volume therethrough;
   (c) said first valve assembly being positioned to direct fluid flow from said filter media internal volume to said second liquid flow outlet, when said first valve assembly is in said open orientation.

3. A liquid filter assembly according to claim 2 wherein:
   (a) said second valve assembly comprises a second spring loaded valve head; and a second valve seat having a flow port extending therethrough; and,
   (b) said second spring loaded valve head has an outer sidewall with outer sidewall first and second, open ends;
      (i) said second valve assembly, when in a closed orientation, having:
         (A) said outer sidewall second open end biased against said second valve seat, by a spring member, in a position circumscribing said flow port in said second valve seat, to inhibit liquid flow directly to said flow port in said second valve seat from said unfiltered liquid volume; and
         (B) said outer sidewall oriented to allow fluid flow therethrough, as controlled by said first valve assembly, from said filtered liquid volume through said second valve seat flow port;
      (ii) said outer sidewall of said second valve head including a pressure shoulder thereon oriented to direct fluid pressure build up within said unfiltered liquid volume, against a direction of force from the spring of the second spring loaded valve head, to selectively position said second valve assembly in an open orientation; said second valve assembly, when in said open orientation, having said second valve head biased away from said second valve seat, to allow fluid flow directly from said unfiltered liquid volume through said second valve seat flow port; and,
(iii) said second valve seat flow port being in fluid flow communication with said second liquid flow outlet.

4. A liquid filter assembly according to claim 3 wherein:
(a) said spring member of said second valve assembly and said first spring member of said first valve assembly comprise the same spring.

5. A liquid filter assembly according to claims 4 wherein:
(a) said filter head includes an air flow channel therethrough; and,
(b) said assembly includes a breather filter construction mounted on said filter head and oriented in air flow communication with said air flow channel in said filter head.

6. A liquid filter assembly according to claim 2 wherein:
(a) said second valve assembly comprises a second spring loaded valve head and a second valve seat having a flow port extending therethrough;
(b) said second valve assembly, when in a closed orientation, having:
  (i) said second valve head biased against said second valve seat by a spring member, in a position blocking said flow port in said second valve seat, to inhibit liquid flow directly through said flow port in said second valve seat from said unfiltered liquid volume; and
(c) said second valve assembly, when in an open orientation, having:
  (i) said second valve head spaced away from said second valve seat, to permit liquid flow through said flow port in said second valve seat from said unfiltered liquid volume to said filtered liquid volume.

7. A liquid filter assembly according to claim 6 wherein:
(a) said second valve assembly is upstream relative to said first valve assembly.

8. A liquid filter assembly according to claim 7 wherein:
(a) said second valve assembly has a central longitudinal axis oriented normal to a central longitudinal axis of the first valve assembly.

9. A liquid filter assembly according to claim 1 including:
(a) a third valve assembly constructed and arranged to selectively open a second liquid flow inlet path to passage of liquid from a second liquid flow inlet to an interior of said housing, in response to a selected pressure differential between the interior of said housing and a region exterior of said housing.

10. A liquid filter assembly according to claim 9 wherein:
(a) said third valve assembly comprises a spring-biased valve head and a valve seat.

11. A liquid filter assembly comprising:
(a) a housing comprising a housing sidewall having upper and lower ends;
  (i) said lower end defining a housing sidewall in-tank liquid flow outlet port;
(b) a filter head mounted on said sidewall upper end; said filter head comprising: a filter head base member; and, a removable center piece; said filter head including a filter head inlet port and a filter head outlet port, said inlet port and said outlet port extending from an exterior surface of said filter assembly to an interior of said filter assembly;
  (i) said filter head defining a liquid flow inlet path leading from said filter head inlet port and a liquid flow outlet path leading to said filter head outlet port;
    (A) said base member defining said liquid flow inlet path;
    (B) said base member defining an oulet path downstream end portion of said liquid flow outlet path;
    (C) said base member including an inner cylinder wall defining a central, open, volume;
  (ii) said removable center piece including a central, depending, outlet member; said removable center piece defining a portion of said liquid flow outlet path in extension from said central depending outlet member to said outlet path downstream end portion in said base member;
  (iii) said center piece being removably mounted on said base member with said central depending outlet member positioned to depend into said central, open, volume defined by said inner cylindrical wall of said base member;
(c) a filter media construction comprising:
  (i) a cylindrical extension of filter media having upper and lower ends and defining an open media interior volume;
  (ii) a first end cap positioned on said upper end of said cylindrical extension of filter media;
    (A) said first end cap being positioned beneath said center piece with said central piece depending outlet member projecting into said media interior volume and with said media interior volume in fluid flow communication with said filter head outlet flow path;
    (B) said first end cap having an exterior surface; said filter media construction being positioned with an external radial seal between said first cap exterior surface and said filter head base member;
  (iii) a second end cap positioned on said lower end of said cylindrical extension of filter media; said second end cap defining a second end cap back pressure flow outlet oriented in fluid flow communication with said housing sidewall in-tank liquid flow outlet port;
(d) a back pressure flow valve secured to said housing and positioned to be received within said open interior volume of said cylindrical extension of media, when said filter media construction is operably positioned within said housing;
  (i) said back pressure flow valve having open and closed orientations;
    (A) said back pressure flow valve, when in said closed orientation, being constructed and arranged to block fluid flow from said open interior volume of said filter media, through said second end cap back pressure flow outlet and to said housing sidewall in-tank liquid flow outlet port;
    (B) said back pressure flow valve, when in said open orientation, being constructed and arranged to allow fluid flow from said open interior volume of said filter media through said second end cap back pressure flow outlet and to said housing sidewall in-tank liquid flow outlet port; and,
    (C) said back pressure flow valve being constructed and arranged to switch between said closed and open orientations in response to a selected back pressure build up resulting in a selected pressure differential between said interior volume of said filter media and said housing sidewall in-tank liquid flow outlet port; and,
(e) a by-pass flow valve positioned within said housing;
  (i) said by-pass flow valve having open and closed orientations;

(A) said by-pass flow valve, when in said closed orientation, being constructed and arranged to block direct fluid flow, from an unfiltered fluid annulus located between said filter media construction and said housing sidewall, to said in-tank liquid flow outlet port;

(B) said by-pass flow valve, when in said open orientation, being constructed and arranged to allow direct fluid flow from said unfiltered fluid annulus to said in-tank liquid flow outlet port without necessary passage through said cylindrical extension of filter media;

(C) said by-pass flow valve being constructed and arranged to switch between said closed and open orientations in response to a selected pressure build up resulting in a selected pressure differential across said filter media.

12. An assembly according to claim 11 wherein:
(a) said filter media construction is secured to said centerpiece; and
(b) said removable centerpiece is positioned in a bore in said base member of sufficient size so that when said centerpiece is withdrawn from said base member said filter media construction is withdrawn upwardly through said bore in said base member, for servicing.

13. An assembly according to claim 12 wherein:
(a) means for removably connecting said filter media construction to said centerpiece so that during servicing a first filter media construction attached to said centerpiece can be replaced by a second filter media construction.

14. An assembly according to claim 12 wherein:
(a) said first end cap has an outer periphery with an external radial seal positioned therearound.

15. An assembly according to claim 14 wherein:
(a) said filter media construction includes a contaminant collection trap mounted thereon; said trap having a circular wall defining an open, upper, edge and being positioned in extension around, and spaced from, said lower end of said cylindrical extension of media.

16. A liquid filter assembly comprising:
(a) a filter head;
(b) a filter housing; said housing comprises a wall having housing first and second, opposite ends; said housing first end being secured to said filter head; and said housing second end being positioned remote to said filter head; said filter head and filter housing in combination defining:
(i) a liquid flow inlet path;
(ii) a first liquid flow outlet path; and,
(iii) a second liquid flow outlet path;
(c) a filter media construction positioned within said housing; said filter media construction defining a filter media internal volume comprising a filtered liquid volume; said filter media construction comprising first and second end caps;
(i) said first end cap having an open central aperture in fluid flow communication with said internal volume and said first liquid flow outlet path;
(ii) said second end cap having an open central aperture with a first valve assembly positioned therein;
(iii) said filter media construction, in combination with said housing and filter head, defining an unfiltered liquid volume and said filtered liquid volume;
(d) a liquid flow inlet;
(i) said liquid flow inlet path being constructed and arranged to direct liquid from said liquid flow inlet to said unfiltered liquid volume;
(e) a first liquid flow outlet;
(i) said first liquid flow outlet path being constructed and arranged to direct liquid flow from said filtered liquid volume to said first liquid flow outlet;
(ii) said liquid flow inlet and said first liquid flow outlet being positioned within said filter head;
(f) a second liquid flow outlet at said housing second end;
(i) said second liquid flow outlet path being constructed and arranged to direct liquid flow from said filtered liquid volume to said second liquid flow outlet;
(g) said first valve assembly constructed and arranged to selectively open said second liquid flow outlet path to passage of liquid therethrough in response to a first selected liquid pressure level within said filtered liquid volume; said first valve assembly comprising an outer wall including, positioned therein:
(i) a first spring loaded valve head having a central, closed portion and a peripheral open portion; and,
(ii) a first valve seat having a valve seat flow port extending therethrough;
(iii) said first valve assembly, when in a closed orientation, having said first spring loaded valve head biased against said first valve seat, by a first spring member, such that said central closed portion of said valve head is in closing relation to said valve seat flow port;
(iv) said first valve assembly, positioned to direct fluid flow from said filter media internal volume to said second liquid flow outlet when in an open orientation, having said valve head biased away from said first valve seat thereby opening both of said valve seat flow port and said peripheral open portion of said valve head, to flow filtered liquid from said filter media internal volume therethrough;
(h) a second valve assembly; said second valve assembly comprising:
(i) a first by-pass valve assembly constructed and arranged to selectively direct fluid flow from said unfiltered liquid volume to said second liquid flow outlet, in response to a second selected liquid pressure level within said unfiltered liquid volume;
(ii) a second spring loaded valve head having an outer sidewall with outer sidewall first and second, open ends;
(iii) a second valve seat having a second valve seat flow port extending therethrough;
(iv) said second valve assembly, when in a closed orientation, having:
(A) said outer sidewall second open end biased against said second valve seat, by a spring member, in a position circumscribing said flow port in said second valve seat, to inhibit liquid flow directly to said flow port in said second valve seat from said unfiltered liquid volume; and
(B) said outer sidewall oriented to allow fluid flow therethrough, as controlled by said first valve assembly, from said filtered liquid volume through said second valve seat flow port;
(v) said outer sidewall of said second valve head including a pressure shoulder thereon oriented to direct fluid pressure build up within said unfiltered liquid volume, against a direction of force from the spring member of the second spring loaded valve head, to selectively position said second valve assembly in an open orientation; said second valve assembly, when in said open orientation, having said second valve head biased away from said second valve seat, to allow fluid flow directly from said unfiltered liquid volume through said second valve seat flow port; and, (vi) said second valve seat flow port being in fluid flow communication with said second liquid flow outlet.

17. A liquid filter assembly according to claim 16 wherein:

(a) said spring member of said second valve assembly and said first spring member of said first valve assembly comprise a same spring.

18. A liquid filter assembly according to claim 16 wherein:

(a) said filter head includes an air flow channel therethrough; and, (b) said assembly includes a breather filter construction mounted on said filter head and oriented in air flow communication with said air flow channel in said filter head.

* * * * *